United States Patent
Yabu

(10) Patent No.: US 9,883,232 B2
(45) Date of Patent: Jan. 30, 2018

(54) DISPLAY CONTROL APPARATUS, AND DISPLAY CONTROL METHOD

(71) Applicant: Panasonic Intellectual Property Management Co., Ltd., Osaka (JP)

(72) Inventor: Hiroshi Yabu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/301,944

(22) PCT Filed: Aug. 21, 2015

(86) PCT No.: PCT/JP2015/004187
§ 371 (c)(1),
(2) Date: Oct. 4, 2016

(87) PCT Pub. No.: WO2016/031203
PCT Pub. Date: Mar. 3, 2016

(65) Prior Publication Data
US 2017/0188090 A1 Jun. 29, 2017

(30) Foreign Application Priority Data
Aug. 26, 2014 (JP) ................. 2014-172098

(51) Int. Cl.
*H04N 21/431* (2011.01)
*H04N 21/435* (2011.01)
(Continued)

(52) U.S. Cl.
CPC ..... *H04N 21/4316* (2013.01); *G06K 9/00744* (2013.01); *G06K 9/3233* (2013.01);
(Continued)

(58) Field of Classification Search
CPC .................................................. H04N 21/431
See application file for complete search history.

(56) References Cited

U.S. PATENT DOCUMENTS

2006/0061595 A1* 3/2006 Goede ................... G06F 17/241
345/619
2008/0310731 A1 12/2008 Stojancic et al.
(Continued)

FOREIGN PATENT DOCUMENTS

JP 9-185720 7/1997
JP 2008-176396 7/2008
(Continued)

OTHER PUBLICATIONS

International Search Report of PCT application No. PCT/JP2015/004187 dated Oct. 20, 2015.

*Primary Examiner* — Michael Teitelbaum
(74) *Attorney, Agent, or Firm* — McDermott Will & Emery LLP

(57) ABSTRACT

A display control device includes: a region specification section; a region-of-interest estimation section; and a position decision section. In each of a plurality of frames included in the video content, the region specification section specifies a first region and a second region included in the region excluding the first region in the frame. In each of the plurality of frames, the region-of-interest estimation section specifies either one of the first region and the second region as a region of interest and the other thereof as a region of non-interest based on a positional relationship between the first region and the second region. The position decision section defines, as a position at which the additional information is to be displayed, a position included commonly in the respective regions of non-interest of the plurality of frames.

7 Claims, 18 Drawing Sheets

(51) Int. Cl.
    *G06K 9/00*         (2006.01)
    *G06K 9/32*         (2006.01)
    *H04N 21/488*     (2011.01)

(52) U.S. Cl.
    CPC ......... *H04N 21/431* (2013.01); *H04N 21/435* (2013.01); *H04N 21/488* (2013.01)

(56) References Cited

U.S. PATENT DOCUMENTS

| | | |
|---|---|---|
| 2010/0318515 A1 | 12/2010 | Ramanathan et al. |
| 2014/0136686 A1* | 5/2014 | Tsai .................. H04L 43/0882 709/224 |

FOREIGN PATENT DOCUMENTS

| | | |
|---|---|---|
| JP | 2010-271987 | 12/2010 |
| JP | 2013-125191 | 6/2013 |
| JP | 2013-164753 | 8/2013 |

\* cited by examiner

DISPLAY CONTROL APPARATUS, AND DISPLAY CONTROL METHOD

CROSS-REFERENCE TO RELATED APPLICATIONS

This application is a U.S. national stage application of the PCT International Application No. PCT/JP2015/004187 filed on Aug. 21, 2015, which claims the benefit of foreign priority of Japanese patent application No. 2014-172098 filed on Aug. 26, 2014, the contents all of which are incorporated herein by reference.

TECHNICAL FIELD

The present disclosure relates to a display control device for displaying video content together with additional information associated with the video content by using a fingerprint, and relates to a display control method therefor.

BACKGROUND ART

A communication service using a technology for recognizing content through a cloud is proposed. If this technology is used, then a television reception device (hereinafter, abbreviated as a "television") can be realized, which recognizes a video input thereto, acquires additional information related to this video via a communication network, and displays the acquired additional information on a display screen together with video content. A technology for recognizing the input video is called "ACR (Automatic Content Recognition)".

For the ACR, a fingerprint technology is sometimes used. Patent Literature 1 and Patent Literature 2 disclose the fingerprint technology. In this technology, an outline of a face or the like, which is reflected on an image frame in the video, is sensed, a fingerprint is created based on the sensed outline, and the created fingerprint is collated with data accumulated in a database.

CITATION LIST

Patent Literature

PTL 1: U.S. Patent Publication No. 2010/0318515
PTL 2: U.S. Patent Publication No. 2008/0310731

SUMMARY

The present disclosure provides a display control device and a display control method, which display video content on a display screen with additional information superimposed on a more appropriate position on the video content.

The display control device in the present disclosure is a device for displaying video content on the display screen together with the additional information associated with the video content by using a fingerprint. This display control device includes: a region specification section; a region-of-interest estimation section; and a position decision section. In each of the plurality of frames included in the video content, the region specification section specifies the first region and the second region included in the region excluding the first region in each of the frames. In each of the plurality of frames, the region-of-interest estimation section specifies either one of the first region and the second region as a region of interest and the other thereof as a region of non-interest based on a positional relationship between the first region and the second region. The position decision section defines, as a position at which the additional information is to be displayed, a position included commonly in the respective regions of non-interest of the plurality of frames.

The display control device in the present disclosure can display video content on a display screen with additional information superimposed on a more appropriate position on the video content.

DESCRIPTION OF EMBODIMENTS

Figure 1:
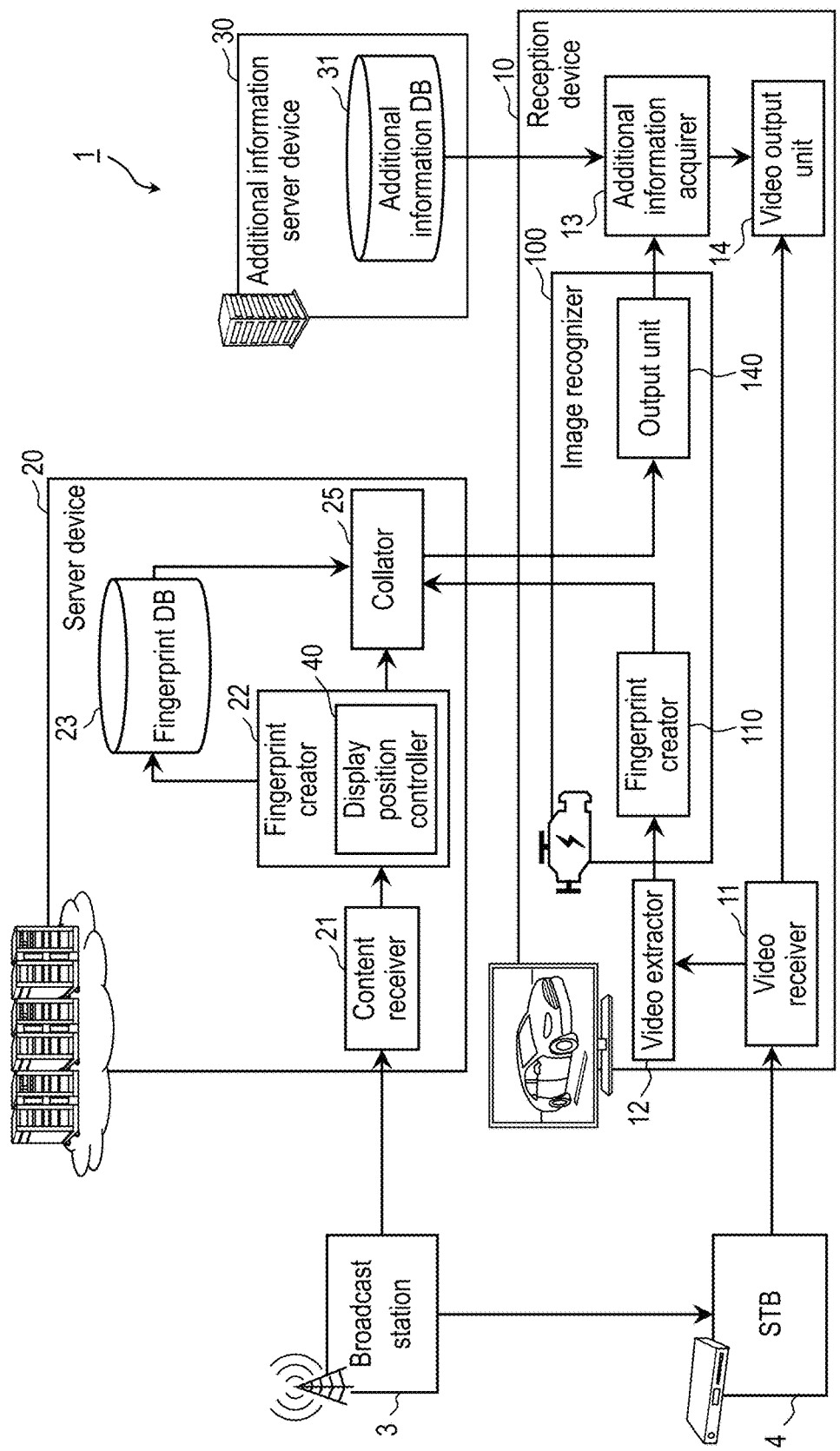
FIG. 1 is a block diagram showing a configuration example of a content recognition system in a first exemplary embodiment.

A description is made below in detail of exemplary embodiments with reference to the drawings as appropriate. However, a description more in detail than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims Moreover, the respective drawings are schematic views, and are not illustrated necessarily exactly. Furthermore, in the respective drawings, the same reference numerals are assigned to the same constituent elements.

First Exemplary Embodiment

A description is made below of a first exemplary embodiment with reference to FIGS. 1 to 14.

[1-1. Content Recognition System]

First, a description is made of content recognition system 1 in this exemplary embodiment with reference to FIG. 1.

FIG. 1 is a block diagram showing a configuration example of content recognition system 1 in the first exemplary embodiment.

Content recognition system 1 includes a display control device for displaying video content together with additional information associated with the video content by using a fingerprint.

As shown in FIG. 1, content recognition system 1 includes: broadcast station 3; STB (Set Top Box) 4; reception device 10; server device 20; and additional information server device 30. In the first exemplary embodiment, server device 20 is an example of the display control device.

Broadcast station 3 is a transmission device configured to convert video content into a video signal to broadcast the video content as a television broadcast signal (hereinafter, also simply referred to as a "broadcast signal"). For example, the video content is broadcast content broadcasted by a wireless or wired broadcast or communication, and includes: program content such as a television program and the like; and advertisement content such as a commercial message (CM) or the like. The program content and the advertisement content are switched from each other with the elapse of time. Broadcast station 3 transmits the video content to STB 4 and server device 20.

STB 4 is a tuner/decoder for television broadcast. STB 4 decodes video content selected based on an instruction of a user from among video signals transmitted from broadcast station 3, and outputs the video content to reception device 10 via a communication path. Note that, for example, the communication path is HDMI (registered trademark) (High-Definition Multimedia Interface).

Reception device 10 is a video reception device such as a television set or the like. Reception device 10 is connected to server device 20 and additional information server device 30 via a communication network. Reception device 10 extracts a plurality of image frames (hereinafter, also simply referred to as "frames") from a frame sequence of the received video content, and performs image recognition for the extracted frames. Reception device 10 acquires additional information from additional information server device 30 based on a result of the image recognition, and displays the acquired additional information on a display screen together with a video in substantially real time.

Note that the frames are pictures which compose the video content. Each of the frames includes a frame in the progressive system, a field in the interlace system, and the like.

For example, server device 20 is a Web server. Server device 20 acquires the video content transmitted from broadcast station 3, analyzes the acquired video content, and thereby creates recognition data corresponding to the video content. For example, the recognition data is data (hash value) representing the video content, and is data for use as a fingerprint in recognizing the video content. Specifically, the recognition data is a fingerprint created based on a change in an image between the frames. For example, server device 20 creates fingerprints for all the pieces of video content broadcasted by broadcast station 3, and accumulates the created fingerprints in a storage (not shown). Note that the recognition of the video content refers to processing for specifying the video content by performing the image recognition by using the fingerprint.

For example, additional information server device 30 is a Web server that distributes additional information related to such an image recognition result provided by reception device 10. For example, additional information server device 30 is an advertisement distribution server that holds and distributes advertisements of a variety of commercial goods.

Note that, in this exemplary embodiment, server device 20 and additional information server device 30 are Web servers independent of each other; however, one Web server may operate as server device 20 and additional information server device 30.

A description is made below of respective configurations of reception device 10, server device 20 and additional information server device 30.

[1-2. Reception Device]

Figure 2:
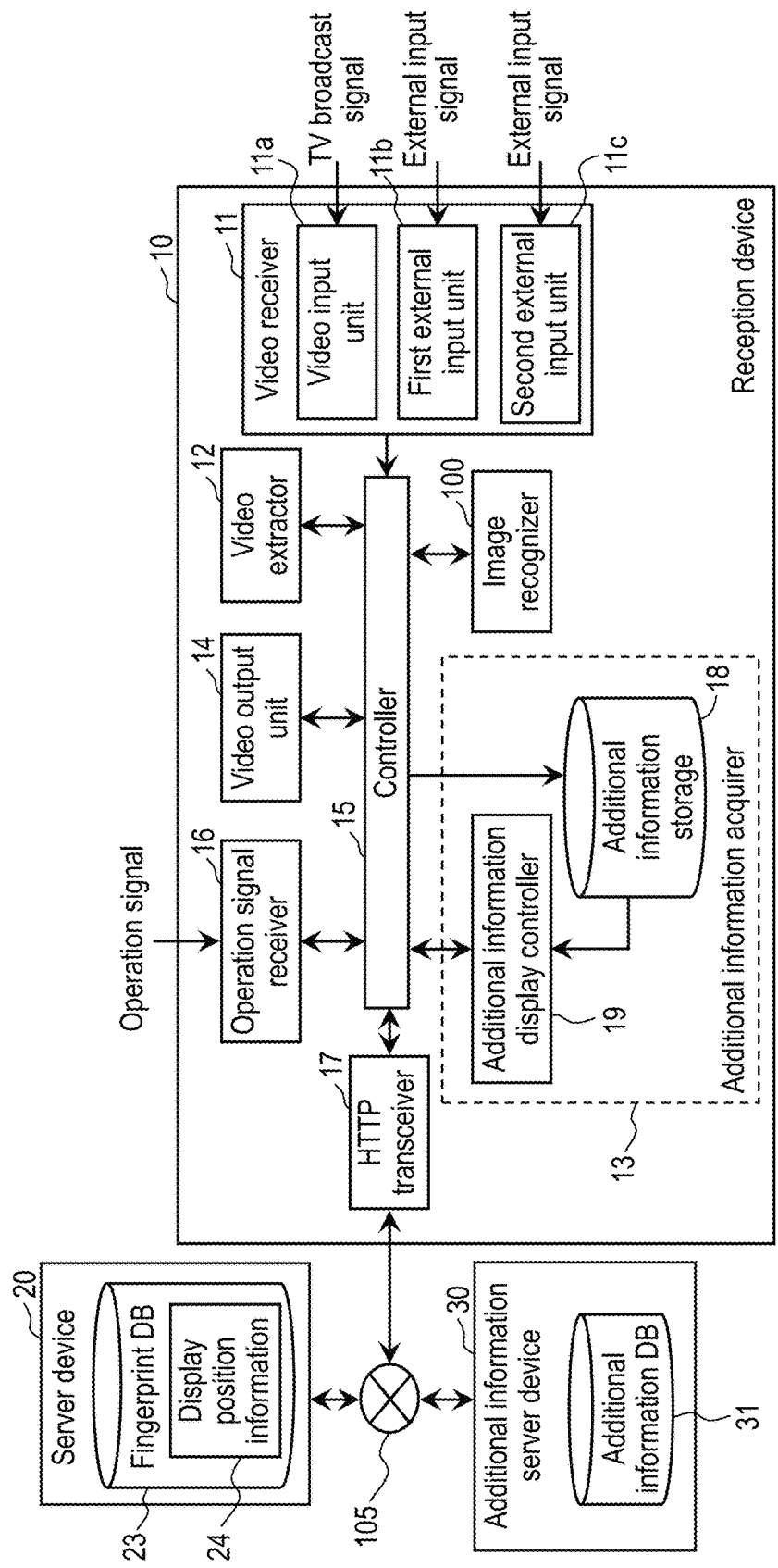
FIG. 2 is a block diagram showing a configuration example of a reception device in the first exemplary embodiment.

First, a description is made of reception device 10 in this exemplary embodiment with reference to FIG. 2 as well as FIG. 1.

FIG. 2 is a block diagram showing a configuration example of reception device 10 in the first exemplary embodiment. Note that FIG. 2 shows a main hardware configuration of reception device 10.

As shown in FIG. 1, reception device 10 includes: video receiver 11; video extractor 12; additional information acquirer 13; video output unit 14; and image recognizer 100. More specifically, as shown in FIG. 2, reception device 10 further includes: controller 15; operation signal receiver 16; and HTTP (Hyper Text Transfer Protocol) transceiver 17. Moreover, additional information acquirer 13 shown in FIG. 1 includes: additional information storage 18; and additional information display controller 19.

Controller 15 is a processor configured to control the respective constituent elements provided in reception device 10. Controller 15 includes a nonvolatile memory, a CPU (Central Processing Unit), and a volatile memory. For example, the nonvolatile memory is a ROM (Read Only Memory) or the like, and stores a program (application program or the like). The CPU is configured to execute the program. For example, the volatile memory is a RAM (Random Access Memory) or the like, and is used as a temporal working area when the CPU operates.

Operation signal receiver 16 is a circuit configured to receive an operation signal output from an operator (not shown). The operation signal is a signal output from the operator (for example, a remote controller) in such a manner that the user operates the operator in order to operate reception device 10. Note that, in a case where the operator is a remote controller having a gyro sensor, operation signal receiver 16 may be configured to receive information regarding a physical motion of the remote controller itself, which is output from the remote controller (that is, the information is a signal indicating a motion of the remote controller when the user performs shaking, tilting, direction change and so on for the remote controller).

HTTP transceiver 17 is an interface configured to communicate with server device 20 and additional information server device 30 via communication network 105. For example, HTTP transceiver 17 is a communication adapter for a wired LAN (Local Area Network), which adapts to the standard of IEEE 802.3.

HTTP transceiver 17 acquires the fingerprints, which are transmitted from server device 20 via communication network 105, and the like. The acquired fingerprints are output to image recognizer 100 via controller 15. Moreover, for example, HTTP transceiver 17 acquires the additional information transmitted from additional information server device 30 via communication network 105. The acquired additional information is stored in additional information storage 18 via controller 15.

Video receiver 11 has a reception circuit and a decoder (either of which is not shown), the reception circuit being configured to receive the video content. For example, video receiver 11 performs the selection of the received broadcast channel, the selection of the signal, which is input from the outside, and the like based on the operation signal received in operation signal receiver 16.

As shown in FIG. 2, video receiver 11 includes: video input unit 11a; first external input unit 11b; and second external input unit 11c.

Video input unit 11a is a circuit configured to receive the video signal transmitted from the outside, such as a broadcast signal (referred to as a "TV broadcast signal" in FIG. 2), which is received, for example, in an antenna (not shown).

First external input unit 11b and second external input unit 11c are interfaces configured to receive the video signals (referred to as "external input signals" in FIG. 2), which are transmitted from external instruments such as STB 4, a video signal recording/playback device, and the like (not shown). For example, first external input unit 11b is an HDMI (registered trademark) terminal, and is connected to STB 4 by a cable conforming to the HDMI (registered trademark).

Video extractor 12 extracts the plurality of frames at a predetermined frame rate from the frame sequence that composes the video content received by video receiver 11. For example, in a case where the frame rate of the video content is 60 fps (Frames Per Second), video extractor 12 extracts the plurality of frames at such a frame rate as 30 fps, 20 fps and 15 fps. Note that, if image recognizer 100 at a subsequent stage has a processing capability sufficient for processing a video at 60 fps, then video extractor 12 may extract all of the frames which compose the frame sequence of the video content.

Additional information acquirer 13 operates as a circuit and a communication interface, which acquire information. Additional information acquirer 13 is configured to acquire the additional information from additional information server device 30 based on the result of the image recognition provided by image recognizer 100.

Video output unit 14 is a display control circuit configured to output the video content, which is received by video receiver 11, to the display screen. For example, the display screen is a display such as a liquid crystal display device, an organic EL (Electro Luminescence), and the like.

Additional information storage 18 is a storage device configured to store the additional information. For example, additional information storage 18 is a nonvolatile storage element such as a flash memory or the like. Additional information storage 18 may hold program meta information such as an EPG (Electronic Program Guide) or the like in addition to the additional information acquired from additional information server device 30.

Additional information display controller 19 is configured to superimpose the additional information acquired from additional information server device 30 onto the video content (for example, program content or advertisement content) received in video receiver 11. For example, additional information display controller 19 creates a superimposed image by superimposing the additional information onto each frame included in the video content, and outputs the created superimposed image to video output unit 14. Video output unit 14 outputs the superimposed image to the display screen, whereby the video content onto which the additional information is superimposed is displayed on the display screen.

Image recognizer 100 is a processor configured to perform the recognition (for example, ACR) of the video content. The video content includes the plurality of frames extracted by video extractor 12, and is a target of the image recognition performed by image recognizer 100. For example, image recognizer 100 is realized by an integrated circuit or the like.

As shown in FIG. 1, image recognizer 100 includes: fingerprint creator 110; and output unit 140.

Fingerprint creator 110 is an example of a recognition data creation circuit. Based on the received video content, fingerprint creator 110 creates the fingerprints for each piece of the video content. Then, fingerprint creator 110 transmits the created fingerprints to server device 20. For a method for creating the fingerprints, a variety of conventional technologies disclosed heretofore can be used. For example, fingerprint creator 110 may create the fingerprints by calculating the hash values of the frames which compose the received video content. Alternatively, based on a change in an image between the frames of the frame sequence that composes the received video content, fingerprint creator 22 may create the fingerprints. The present disclosure does not limit a creation method of the fingerprints.

Output unit 140 receives a collation result output from collator 25 of server device 20, and outputs a result of the image recognition. Specifically, based on the collation result received from server device 20, output unit 140 creates information indicating the video content received by video receiver 11, and outputs the created information as the result of the image recognition. For example, the result of the image recognition is a content ID (IDentifier), which indicates the video content received by video receiver 11.

[1-3. Server Device]

Next, a description is made of server device 20 in this exemplary embodiment with reference to FIGS. 1 and 2.

Server device 20 acquires the video content transmitted from broadcast station 3, and creates the recognition data corresponding to the acquired video content.

As shown in FIG. 1, server device 20 includes: content receiver 21; fingerprint creator 22; fingerprint DB (Data Base) 23; and collator 25. Note that, in server device 20 of FIG. 2, only fingerprint DB 23 is shown, and other blocks are omitted.

Content receiver 21 includes a reception circuit and a decoder, and is configured to receive the video content transmitted from broadcast station 3. For example, content receiver 21 receives all the pieces of video content created and transmitted by broadcast station 3. Content receiver 21 outputs such received pieces of video content to fingerprint creator 22.

Based on the received video content, fingerprint creator 22 creates the fingerprints for each piece of the video content. Fingerprint creator 22 creates the fingerprints by substantially the same method as that of fingerprint creator 110 of reception device 10. Then, fingerprint creator 22 stores the created fingerprint in fingerprint DB 23.

Fingerprint creator 22 has display position controller 40. Display position controller 40 is a control circuit that controls a display position of the additional information when video output unit 14 displays the received video content on the display screen. Display position controller 40 creates display position information 24, and stores display position information 24 thus created in fingerprint DB 23. Display position information 24 is information which indicates a position where the additional information is to be displayed on the display screen, the additional information being acquired by additional information acquirer 13 based on the result of the image recognition in image recognizer 100. Operations of display position controller 40 will be described later.

Note that, in server device 20, such processing in which fingerprint creator 22 creates the fingerprints and stores that fingerprints in fingerprint DB 23 and such processing in which display position controller 40 creates the display position information and stores the display position information in fingerprint DB 23 may be performed independently of and simultaneously, or either processing may be performed first, and the other processing may be performed thereafter.

Fingerprint DB 23 is a database in which information representing the video content and the fingerprint are associated with each other for each piece of the video content. In fingerprint DB 23, for example, identification information (for example, content IDs) for identifying the plurality of pieces of video content from one another and the fingerprints are associated with each other and stored. Every time when new video content is received in content receiver 21, server device 20 creates new fingerprints in fingerprint creator 22, and updates fingerprint DB 23. Moreover, fingerprint DB 23 holds display position information 24 output by display position controller 40. Fingerprint DB 23 is stored in a storage device (for example, an HDD (Hard Disk Drive) or the like) provided in server device 20. Note that fingerprint DB 23 may be stored in a storage device placed at the outside of server device 20.

Collator 25 collates the fingerprint, which is created in reception device 10, and the plurality of fingerprints, which are created in fingerprint creator 22 and accumulated in fingerprint DB 23, with each other, and specifies a fingerprint, which coincides with or is similar to the fingerprint created in reception device 10, from the plurality of fingerprints accumulated in fingerprint DB 23. Then, collator 25 outputs information which indicates the video content corresponding to the specified fingerprint, as a collation result, to reception device 10.

Note that collator 25 is also capable of directly receiving the fingerprints from fingerprint creator 22, and of collating those fingerprints and the fingerprint which is received from reception device 10 with each other.

Note that server device 20 includes a communicator (not shown), and communicates with reception device 10 via the communicator. When collator 25 acquires the recognition data from reception device 10, the communicator is used.

[1-4. Additional Information Server Device]

Next, a description is made of additional information server device 30.

Additional information server device 30 is a Web server configured to distribute the additional information related to the video content transmitted from broadcast station 3. As shown in FIG. 1, additional information server device 30 includes additional information DB 31.

Additional information DB 31 is a database in which the information representing the video content and the additional information are associated with each other for each piece of the video content. In additional information DB 31, for example, the content IDs and the additional information are associated with each other.

Additional information DB 31 is stored in a storage device (for example, HDD and the like) provided in additional information server device 30. Note that additional information DB 31 may be stored in a storage device placed at the outside of additional information server device 30.

For example, the additional information is information indicating an attribute of an object (for example, commercial goods as an advertisement target, and the like), which is displayed in the video content. For example, the additional information is information regarding the commercial goods, such as specifications of the commercial goods, a dealer (for example, address, URL (Uniform Resource Locator), telephone number and the like of the dealer), manufacturer, method of use, effect and the like.

[1-5. Display Position Controller]

Next, a description is made of display position controller 40 in this exemplary embodiment. Note that, as shown in FIG. 1, display position controller 40 is one of functional blocks that fingerprint creator 22 has.

Figure 3:
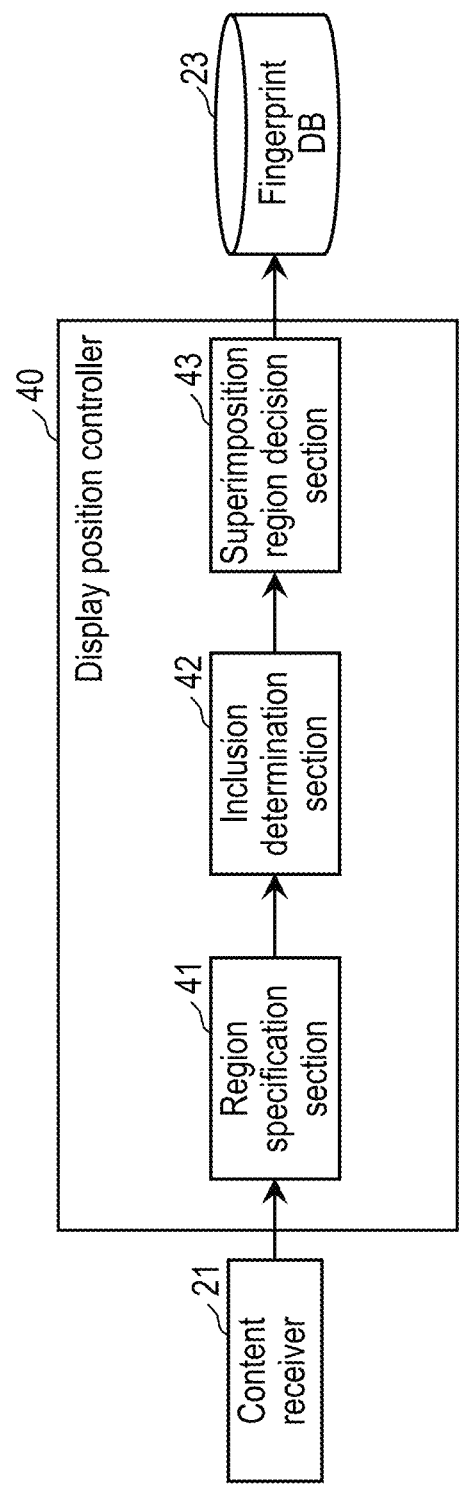
FIG. 3 is a block diagram showing a configuration example of a display position controller in the first exemplary embodiment.

FIG. 3 is a block diagram showing a configuration example of display position controller 40 in the first exemplary embodiment.

As shown in FIG. 3, display position controller 40 includes: region specification section 41; inclusion determination section 42; and superimposition region decision section 43.

In each of the plurality of frames included in the video content, region specification section 41 specifies a first region and a second region included in a region excluding the first region in the frame. The first region and the second region refer to two regions having different features in the frame.

In the frame, for example, region specification section 41 specifies, as the first region, a region in which the change in the image is larger than a predetermined magnitude, and specifies, as the second region, a region in which the change in the image is smaller than the predetermined magnitude. For example, the first region is a region in which there occurs a large change in the image at a time when the scene is switched (hereinafter, the region is also referred to as a "dynamic region"). For example, the second region is a background in an image, or a region occupied by a subject with small motion and change (hereinafter, the region is also referred to as a "static region").

As described above, in this exemplary embodiment, a description is made of an example of specifying such a region (dynamic region), in which a motion amount is larger than a predetermined value, as the first region, and specifying such a region (static region), in which a motion amount is smaller than the predetermined value, as the second region. However, the present disclosure does not limit the first region and the second region to the above-mentioned setting. For example, in the frame, a portion on which a predetermined subject is displayed may be specified as the first region, and a portion on which the predetermined subject is not displayed as the second region. Note that a method for determining the magnitude of the change in the image will be described later.

Note that the above-described plurality of frames are frames which compose the video content received from broadcast station 3 by content receiver 21. Here, the following description is made on the assumption that content receiver 21 has already received and held the above-described plurality of frames for the purpose of the processing in display position controller 40.

In each of the above-described plurality of frames, inclusion determination section 42 decides a region of interest and a region of non-interest based on a positional relationship between the first region and the second region. Inclusion determination section 42 specifies either one of the first region and the second region as the region of interest, and specifies the other thereof as the region of non-interest.

In each of the above-described plurality of frames, inclusion determination section 42 determines whether or not the first region and the second region are in a predetermined positional relationship. Specifically, inclusion determination section 42 determines whether or not the first region and the second region are in a positional relationship in which one thereof includes the other. Hereinafter, such a relationship is referred to as an "inclusion relationship". The "inclusion relationship" refers to a positional relationship in which one region surrounds the other region. Note that the "inclusion relationship" in the present disclosure includes not only a state where one region surrounds an entire periphery of the other region, but also a state where one region surrounds a part of a periphery of the other region. Note that inclusion determination section 42 is an example of a region-of-interest estimation section.

In this exemplary embodiment, a region that includes the other region is specified as the region of non-interest, and the region that is included is specified as the region of interest.

Superimposition region decision section 43 decides a position on the display screen, at which the additional information is to be displayed. Superimposition region decision section 43 defines, as a position at which the additional information is to be displayed, a position included commonly in the respective regions of non-interest in the above-described plurality of frames. Specifically, based on the respective regions of non-interest in the plurality of frames, which are decided by inclusion determination section 42, superimposition region decision section 43 decides one position included commonly in the respective regions of non-interest, and defines the decided position as such a display position of the additional information. This position serves as such a position at which video output unit 14 is to display the additional information during a period of displaying the above-described plurality of frames on the display screen. Note that this position is a fixed position in the screen, that is, a position that does not move in the screen with the elapse of time. Note that superimposition region decision section 43 is an example of a position decision section.

[1-6. Operations]

Figure 11:
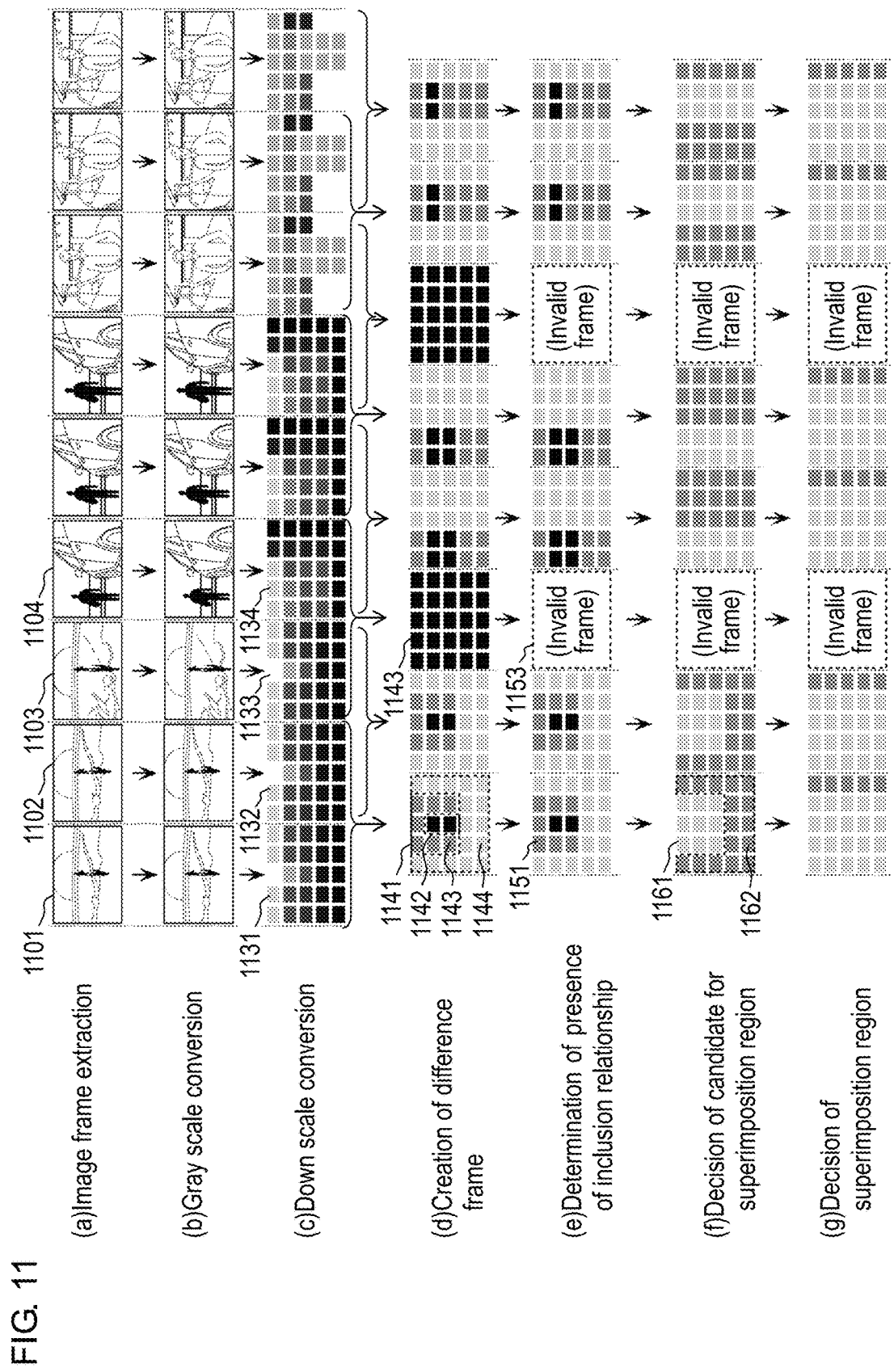
FIG. 11 is a view schematically showing a specific example of the content recognition processing in the first exemplary embodiment.
Figure 12:
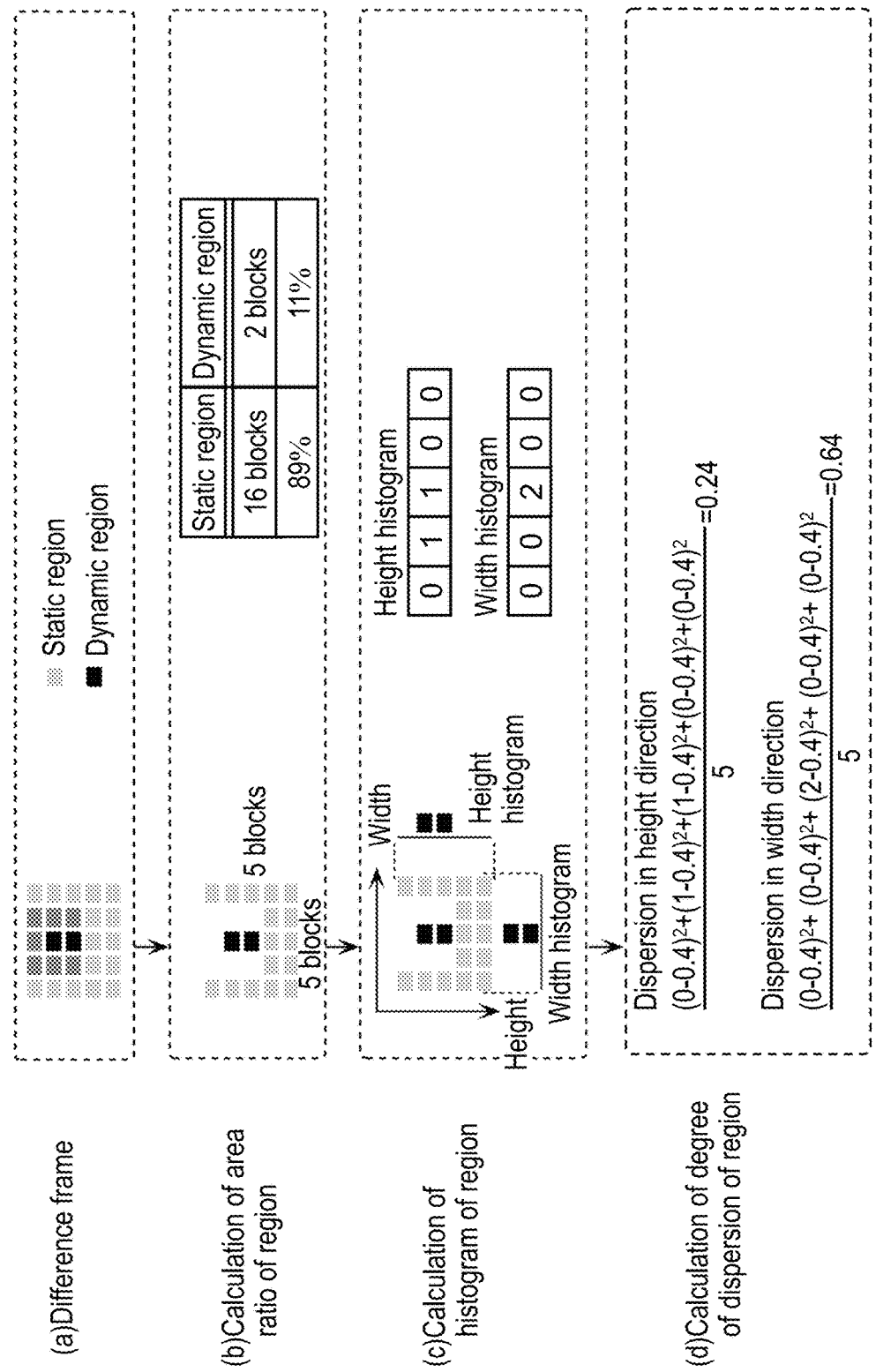
FIG. 12 is a first view schematically showing a specific example of processing for determining whether to allow superimposition display in the first exemplary embodiment.
Figure 13:
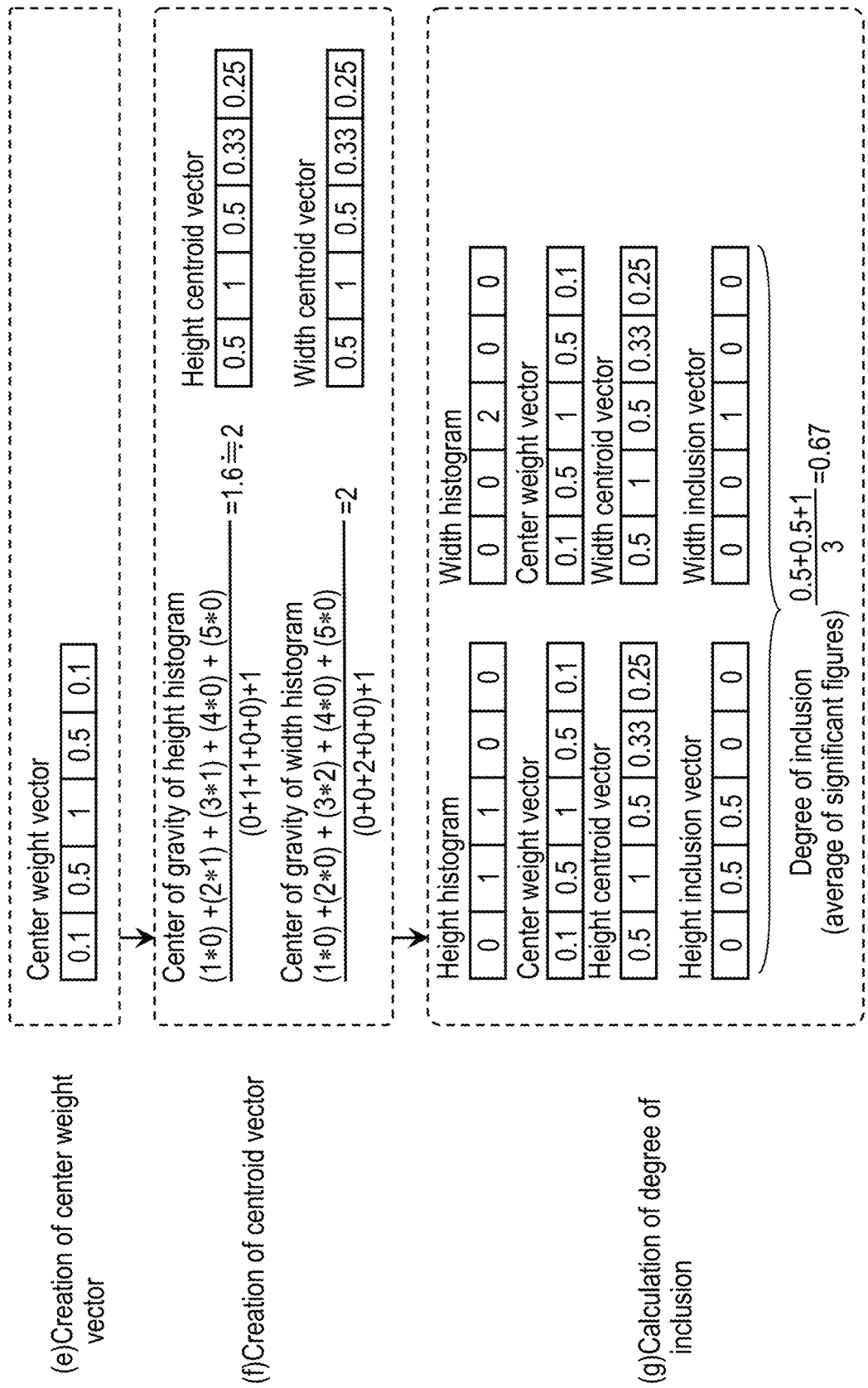
FIG. 13 is a second view schematically showing the specific example of the processing for determining whether to allow the superimposition display in the first exemplary embodiment.

With regard to display position controller 40 configured as described above, operations thereof are described. Note that FIG. 4 to FIG. 10 are flowcharts of processing included in content recognition processing, and FIG. 11 to FIG. 13 are views schematically showing specific examples of the content recognition processing. Hereinbelow, a description is made with reference to these drawings as appropriate.

Figure 4:
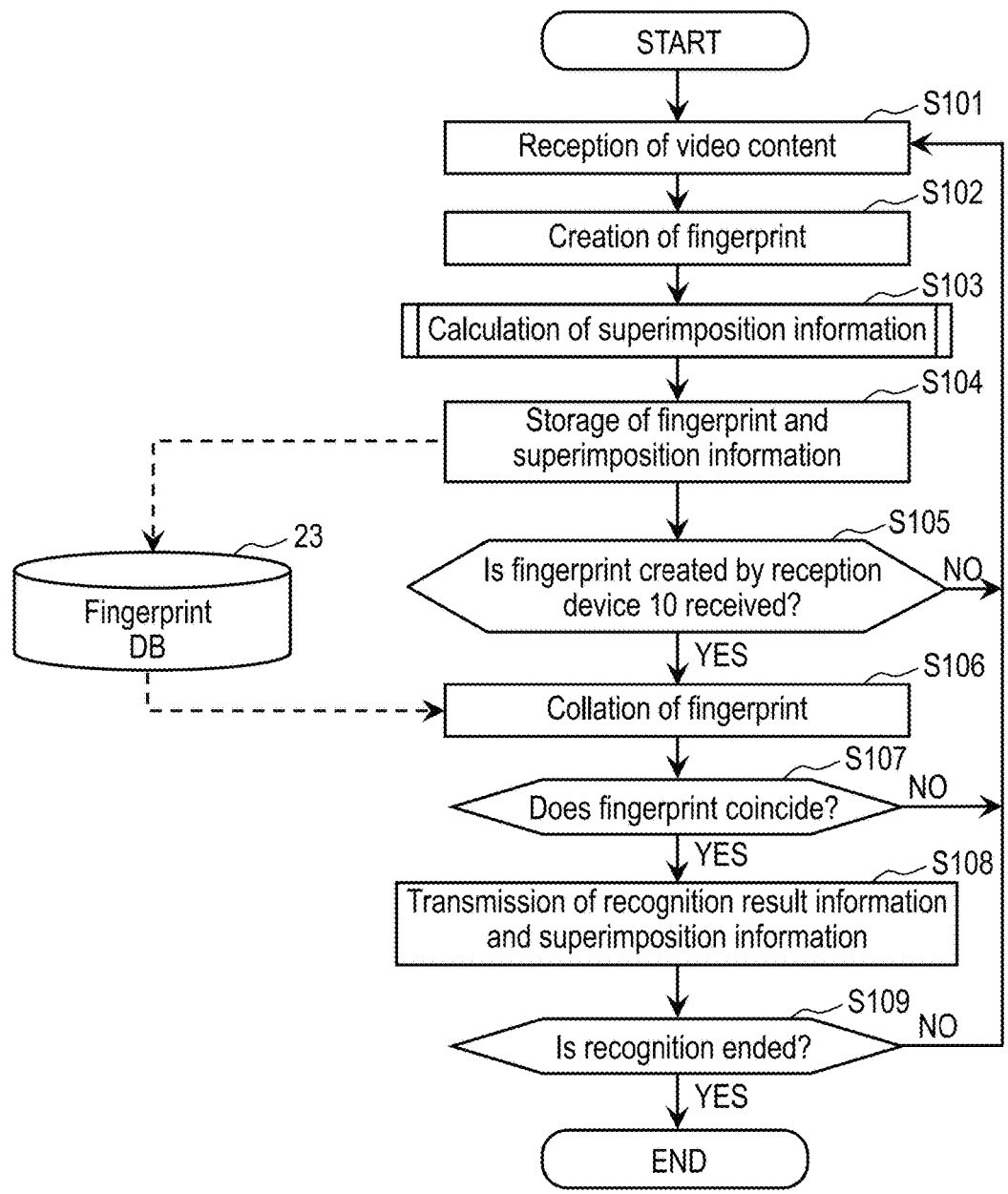
FIG. 4 is a flowchart showing an example of content recognition processing in the first exemplary embodiment.

FIG. 4 is a flowchart showing an example of content recognition processing in the first exemplary embodiment.

First, content receiver 21 receives the video content, which is transmitted from broadcast station 3 and includes the plurality of frames (Step S101).

Next, fingerprint creator 22 creates the fingerprint with regard to the plurality of frames of the video content received by content receiver 21 in Step S101 (Step S102).

Next, display position controller 40 calculates superimposition information (Step S103).

In a case where the video content received by content receiver 21 in Step S101 is displayed on the display screen together with the additional information, display position controller 40 calculates such a display position of the additional information on the video content, and a display period of the additional information. This additional information is additional information associated by additional information DB 31 with the fingerprint created in Step S102 with regard to the video content received in Step S101. Note that a region on which the additional information is displayed on the video content is also referred to as a "superimposition region", and a period during which the additional information is displayed on the video content is also referred to as a "superimposition period".

Next, fingerprint creator 22 stores the fingerprint, which is created in Step S102, and the superimposition region information, which is created in Step S103, in fingerprint DB 23 (Step S104). In such a way, fingerprint DB 23 is updated.

Next, collator 25 waits for reception of the fingerprint, which is created in reception device 10, from reception device 10 (Step S105). Here, the fingerprint of which reception is awaited by collator 25 is a fingerprint created by fingerprint creator 110 of reception device 10 from the same video content as the video content received by video receiver 11.

When collator 25 receives the fingerprint in Step S105 (Yes in Step S105), the processing proceeds to Step S106. Meanwhile, when collator 25 does not receive the fingerprint in Step S105 (No in Step S105), the processing returns to Step S101, and content receiver 21 newly receives video content. Collator 25 collates the fingerprint, which is received from reception device 10 in Step S105, with the fingerprint accumulated in fingerprint DB (Step S106).

Next, collator 25 determines whether or not the two collated fingerprints coincide with each other as a result of the collation in Step S106 (Step S107).

Collator 25 determines whether or not the fingerprint, which is created by fingerprint creator 22 in Step S102, and the fingerprint, which is received from reception device 10 in Step S105, coincide with each other.

When collator 25 determines that the two fingerprints coincide with each other in Step S107 (Yes in Step S107), the processing proceeds to Step S108. Meanwhile, when collator 25 determines that the two fingerprints do not coincide with each other (No in Step S107), the processing returns to Step S101, and content receiver 21 newly receives video content.

Collator 25 transmits information indicating a result of the collation, which is executed in Step S106 (that is, the result of the image recognition), and the superimposition region information, which is calculated in Step S103, to reception device 10 (Step S108).

Next, server device 20 determines whether or not the recognition of the video content is completed (Step S109).

Server device 20 determines whether or not the information which indicates the result of the image recognition and the superimposition region information are obtained for each of the plurality of frames included in the video content. Then, in a case where it is determined that the information which indicates the result of the image recognition and the superimposition region information are obtained for all of the frames, the content recognition processing is ended (Yes in Step S109). Meanwhile, in a case where it is determined that there is a frame for which the information which indicates the result of the image recognition and the superimposition region information are not obtained yet (No in Step S109), the processing returns to Step S101, and content receiver 21 newly receives video content.

Note that, in the flowchart of the content recognition processing of FIG. 4, the description is made of the operation example where display position controller 40 calculates the superimposition information in Step S103 after fingerprint creator 22 creates the fingerprint in Step S102; however, the present disclosure is never limited to this operation. For example, Step S102 and Step S103 may be performed concurrently (substantially simultaneously). Alternatively, Step S102 may be performed after Step S103.

Figure 5:
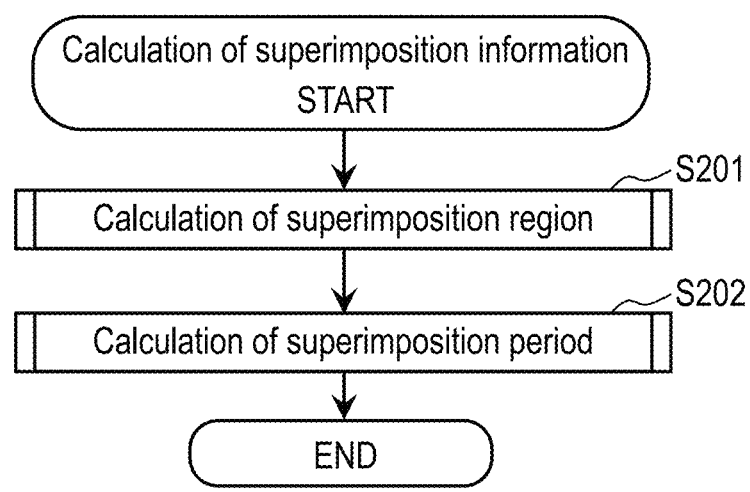
FIG. 5 is a flowchart showing an example of processing for calculating superimposition region information in the first exemplary embodiment.

FIG. 5 is a flowchart showing an example of processing for calculating the superimposition region information in the first exemplary embodiment. A series of processing shown in FIG. 5 illustrates in detail the processing of Step S103 in FIG. 4.

Display position controller 40 calculates the superimposition region that is a region on which the additional information is to be displayed on the video content (Step S201).

The superimposition region is decided at a position that is included in a region in which a degree of interest of the user is estimated to be relatively low, and does not move on the screen during a period while a plurality of frames are displayed on the display screen. Specific processing of the above will be described later.

Next, display position controller 40 calculates the superimposition period that is a period while the additional information is to be displayed on the video content (Step S202).

The superimposition period is a period while the superimposition region is effective, and corresponds to the period while the plurality of frames are displayed on the display screen, the period being used for calculation of the superimposition region. Specific processing of the above will be described later.

Figure 6:
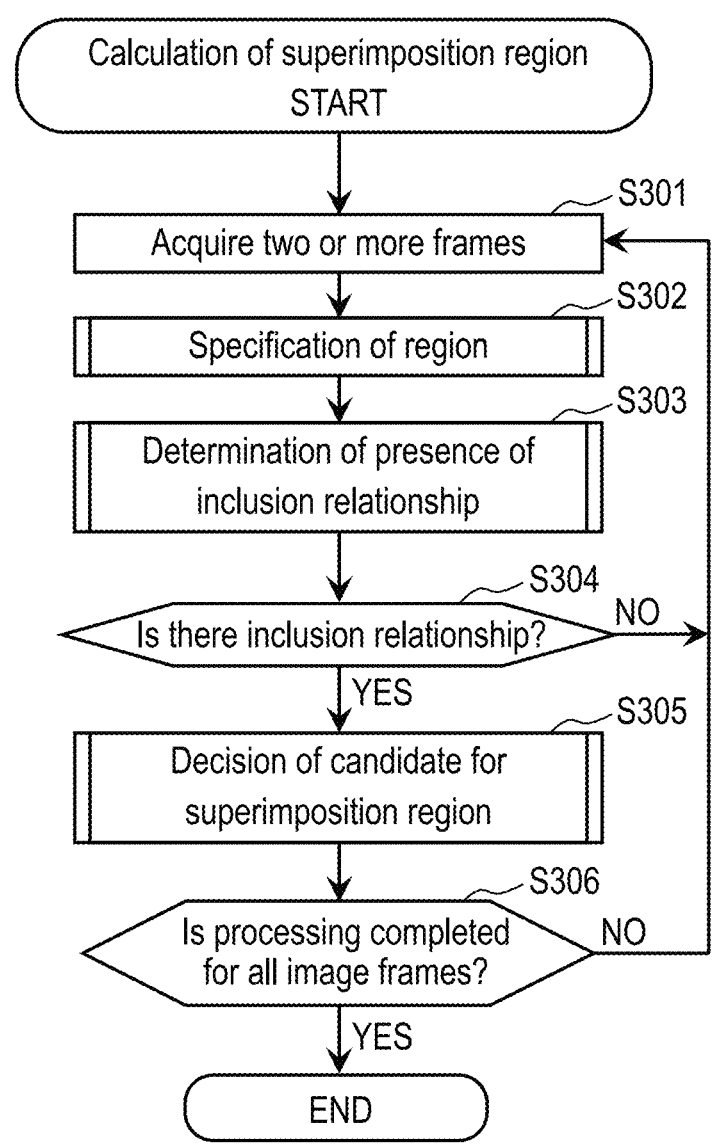
FIG. 6 is a flowchart showing an example of processing for calculating a superimposition range in the first exemplary embodiment.

FIG. 6 is a flowchart showing an example of processing for calculating a superimposition range in the first exemplary embodiment. The flowchart shown in FIG. 6 illustrates in detail the processing of Step S201 in FIG. 5.

The flowchart shown in FIG. 6 is described below with reference to FIG. 11. FIG. 11 is a view schematically showing a specific example of the content recognition processing in the first exemplary embodiment.

First, display position controller 40 acquires two or more frames among the plurality of frames received by content receiver 21 (Step S301).

An example of the frames acquired in Step S301 is shown in (a) of FIG. 11. (a) of FIG. 11 shows an example where 9 frames are acquired, the 9 frames include 3 different scenes, and each of the scenes is composed of 3 frames.

Next, region specification section 41 specifies the first region and the second region for each of the two or more frames acquired by display position controller 40 in Step S302 (Step S302).

Region specification section 41 compares two temporally adjacent frames among the above-described two or more frames with each other, thereby creates a difference frame, and specifies the first region and the second region in the created difference frame. Then, in a processing step executed later, a position included in either of these regions is decided as the position at which the additional information is to be displayed.

An example of the difference frame created in Step S302 is shown in (d) of FIG. 11. The difference frame is a frame that indicates a magnitude of a change in an image in a pixel (or a block including the pixel) in the frame. Note that, in (d) of FIG. 11, the magnitude of the change in the image is displayed by gray scale, and a block in which the change in the image is relatively large is displayed densely, and a block in which the change in the image is relatively small is displayed lightly.

Here, as a specific example, difference frame 1141 shown in (d) of FIG. 11 is described. Difference frame 1141 is a difference frame created from frame 1131 and frame 1132, which are created in such a manner that image frame 1101 and image frame 1102, which are shown in (a) of FIG. 11, are subjected to gray scale conversion and down scale conversion, which will be described later. In each of image frame 1101 and image frame 1102, a person displayed on a vicinity of a center in the frame moves, there is a relatively large change in the image in a region of the person, and there is a relatively small change in the image on a peripheral portion of the person. In difference frame 1141, portion 1142 that indicates a region including an action of the person is displayed by a color relatively close to black, portion 1143 that indicates a region where there is a relatively small change in the image is displayed by a color with an intermediate density, and portion 1144 that indicates a region that is not included in either of the above is displayed by a color relatively close to white.

Next, difference frame 1143 shown in (d) of FIG. 11 is described. Difference frame 1143 is a difference frame created from frame 1133 and frame 1134, which are created in such a manner that image frame 1103 and image frame 1104, which are shown in (a) of FIG. 11, are subjected to the gray scale conversion and the down scale conversion, which will be described later. Between image frame 1103 and image frame 1104, there exists scene switching of the video content. That is to say, difference frame 1143 is a difference frame corresponding to the scene switching. Hence, between frame 1134 and frame 1134, a relatively large change in the image occurs in a major part of the pixels. Therefore, the region in difference frame 1143 is almost entirely displayed by the color close to black.

Next, inclusion determination section 42 determines the positional relationship between the first region and the second region (Step S303).

Inclusion determination section 42 determines whether or not the first region is in a positional relationship of including the second region. That is to say, inclusion determination section 42 determines whether or not there is an inclusion relationship between the first region and the second region.

An example of frames which indicate a result of the determination in Step S303 is shown in (e) of FIG. 11. The frames shown in (e) of FIG. 11 are those, which are determined to have the inclusion relationship by inclusion determination section 42 in Step S303, among the difference frames shown in (d) of FIG. 11. Moreover, frames, each of which is described as "invalid frame" in (e) of FIG. 11, are those determined not to have the inclusion relationship by inclusion determination section 42 in Step S303.

The difference frames determined to have the inclusion relationship by inclusion determination section 42 in Step S303 are directly used for next processing. The difference frames determined not to have the inclusion relationship by inclusion determination section 42 in Step S303 serve as the invalid frames.

Here, as a specific example, frame 1151 and frame 1153, which are shown in (e) of FIG. 11, are described. Frame 1151 is the same frame as difference frame 1141 shown in (d) of FIG. 11. Inclusion determination section 42 determines that difference frame 1141 shown in (d) of FIG. 11 has the inclusion relationship as a result of determining the presence of the inclusion relationship therein, and accordingly, specifies difference frame 1141 directly as frame 1151.

Frame 1153 is the invalid frame. Inclusion determination section 42 determines that difference frame 1143 shown in (d) of FIG. 11 does not have the inclusion relationship as a result of determining the presence of the inclusion relationship therein, and accordingly, specifies frame 1153 as the invalid frame. As described above, the difference frame created in response to the scene switching is prone to serve as the invalid frame since the change in the image is relatively large almost entirely in the frame thereof.

Next, the processing is branched based on such determination results in Step S303 (Step S304).

In a case where it is determined in Step S303 that the first region and the second region have the inclusion relationship (Yes in Step S304), the processing proceeds to Step S305. Meanwhile, in a case where it is determined in Step S303 that the first region and the second region do not have the inclusion relationship (No in Step S304), the processing returns to Step S301, and display position controller 40 newly acquires two or more frames.

Superimposition region decision section 43 decides one of the first region and the second region as a candidate for the superimposition region (Step S305).

Superimposition region decision section 43 decides, as the candidate for the superimposition region, a region including the other region in the inclusion relationship between the first region and the second region. For example, in the case where the first region is in the positional relationship of including the second region, a position included in the first region is decided as the candidate for the superimposition region. Note that the candidate for the superimposition region stands for a candidate for a region on which the additional information is superimposed and displayed on the display screen in video output unit 14 of reception device 10. Finally, a position included in the candidate for the superimposition region is decided as such a position at which the additional information is to be displayed.

An example of the candidate for the superimposition region, which is decided in Step S305, is shown in (f) of FIG. 11. As shown in (f) of FIG. 11, for the difference frames determined to have the inclusion relationship, the region including the other region is decided as the candidate for the superimposition region.

Here, as a specific example, frame 1161 shown in (f) of FIG. 11 is described. Frame 1161 shows a candidate for the superimposition region, which is decided by superimposition region decision section 43 for frame 1151 shown in (e) of FIG. 11. Portion 1162 in frame 1161 is the candidate for the superimposition region in frame 1161. Portion 1162 is a portion corresponding to the region including the other region in the first region and the second region, which are set in frame 1151.

Note that, if the processing of Step S305 is executed previously, superimposition region decision section 43 obtains a new candidate for the superimposition region, which is decided in Step S305 performed this time, in a state of holding the candidate for the superimposition region, which is decided in Step S305 performed previously. In that case, a position included in the candidate for the superimposition region, which is newly obtained in Step S305 performed this time, is added to the candidate for the superimposition region, which is held as a result of Step S305 performed previously.

Next, display position controller 40 determines whether or not the processing from Step S302 to Step S305 is performed for all frames of the plurality of frames received by content receiver 21 (Step S306).

In a case where it is determined in Step S306 that the processing from Step S302 to Step S305 is performed for all frames (Yes in Step S306), the series of processing shown in FIG. 6 is ended. Meanwhile, in a case where it is determined in Step S306 that there is a frame for which those pieces of the processing are not performed yet (No in Step S306), then the processing returns to Step S301, and display position controller 40 newly acquires two or more frames.

Figure 7:
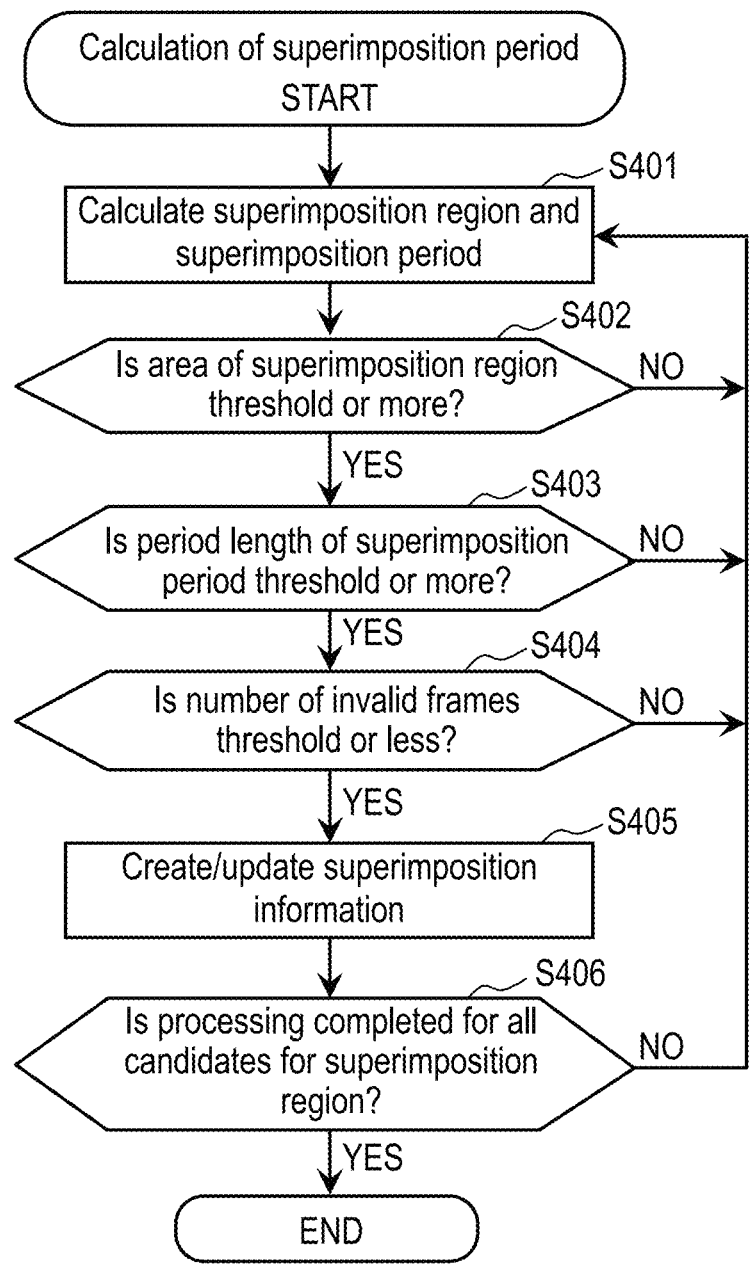
FIG. 7 is a flowchart showing an example of processing for calculating a superimposition period in the first exemplary embodiment.

FIG. 7 is a flowchart showing an example of processing for calculating the superimposition period in the first exemplary embodiment. The flowchart shown in FIG. 7 illustrates in detail the processing of Step S202 in FIG. 5.

The flowchart shown in FIG. 7 is described below with reference to FIG. 11.

First, superimposition region decision section 43 calculates, as the superimposition region, a region (hereinafter, referred to as a "common region") included commonly in two or more candidates for the superimposition region, which are decided in Step S305 of FIG. 6. Then, superimposition region decision section 43 holds the superimposition region information that is information indicating the superimposition region. Moreover, superimposition region decision section 43 calculates, as the superimposition period, a period while the frame including the candidate for the superimposition region is to be displayed on the display screen. Then, superimposition region decision section 43 holds superimposition period information that is information indicating the superimposition period (Step S401).

Next, superimposition region decision section 43 determines whether or not an area of the superimposition region calculated in Step S401 is a predetermined threshold (hereinafter, also referred to as a "superimposition area threshold") or more (Step S402).

In order to display the additional information on the display screen, a region having an area corresponding to the additional information is necessary on the display screen. In Step S402, it is determined whether or not the superimposition region calculated in Step S401 has a size sufficient for displaying the additional information.

In a case where it is determined in Step S402 that the area of the superimposition region is the superimposition area threshold or more (Yes in Step S402), the processing proceeds to Step S403. Meanwhile, in a case where it is determined that the area of the superimposition region is less than the superimposition area threshold (No in Step S402), the processing returns to Step S401, and a superimposition region is newly calculated.

Superimposition region decision section 43 determines whether or not a time length of the superimposition period calculated in Step S401 is a predetermined threshold (hereinafter, also referred to as a "superimposition time threshold") or more (Step S403).

In order that the user can visually recognize the additional information displayed on the display screen, it is desirable that the additional information be displayed for a fixed period or more at the same spot on the display screen. In Step S403, it is determined whether or not the time length of the superimposition period calculated in Step S401 is the predetermined threshold or more, the threshold ensuring the additional information to be displayed at the same position during the period sufficient for the user to visually recognize the additional information.

Note that the above-described fixed period, that is, the superimposition time threshold is, for example, approximately 5 seconds to 10 seconds; however, the present disclosure is never limited to this numeric value. In response to preference of the user, and the like, the superimposition time threshold may be set so that the above-described fixed period can become longer, or the superimposition time threshold may be set so that the above-described fixed period can become shorter.

In a case where it is determined in Step S403 that the time length of the superimposition period is the superimposition time threshold or more (Yes in Step S403), the processing proceeds to Step S404. Meanwhile, in a case where it is determined that the time length of the superimposition period is less than the superimposition time threshold (No in Step S403), the processing returns to Step S401, and a superimposition region is newly calculated.

Superimposition region decision section 43 determines whether or not the number of invalid frames included in the superimposition period calculated in Step S401 is a predetermined threshold (hereinafter, also referred to as an "invalid frame threshold") or less (Step S404).

In a case where the video content includes the invalid frames continuously or intermittently, display position controller 40 cannot appropriately determine the position at which the additional information is to be displayed. In Step S404, it is determined whether or not the number of invalid frames included in the superimposition period calculated in Step S401 is appropriate.

Note that, in Step S404, a determination as to whether or not the number of frames which are not the invalid frames is a predetermined number or more may be performed without performing such a determination as to whether or not the number of invalid frames is the invalid frame threshold or less.

In a case where it is determined in Step S404 that the number of invalid frames is the invalid frame threshold or less (Yes in Step S404), the processing proceeds to Step S405. Meanwhile, in a case where it is determined that the number of invalid frames exceeds the invalid frame threshold (No in Step S404), the processing returns to Step S401, and a superimposition region is newly calculated.

Superimposition region decision section 43 creates the superimposition information based on the superimposition region information and the superimposition period information. Then, superimposition region decision section 43 holds the created superimposition information (Step S405).

For such a superimposition region determined to be appropriate for displaying the additional information in all of Step S402, Step S403 and Step S404, superimposition region decision section 43 creates the superimposition information including: the superimposition region information that is information indicating the superimposition region; and the superimposition period information that is information indicating the period of displaying the additional information on the superimposition region. Note that, in a case of already holding the superimposition information, superimposition region decision section 43 adds the newly created superimposition information to the already held superimposition information, and updates the superimposition information.

An example of the superimposition region indicated by the superimposition information created in Step S405 is shown in (g) of FIG. 11. As shown in (g) of FIG. 11, the position included commonly in the respective candidates for the superimposition region, which are shown in (f) of FIG. 11, is decided as the superimposition region.

Next, superimposition region decision section 43 determines whether or not the processing from Step S401 to Step S405 is performed for all of the two or more candidates for the superimposition region (Step S406).

In a case where it is determined in Step S406 that the processing from Step S401 to Step S405 is performed for all of the candidates for the superimposition region (Yes in Step S406), the series of processing shown in FIG. 7 is ended. Meanwhile, in a case where it is determined in Step S406 that there is a candidate for the superimposition region, for which the processing from Step S401 to Step S405 is not performed yet (No in Step S406), the processing returns to Step S401, and a superimposition region is newly calculated.

Figure 8:
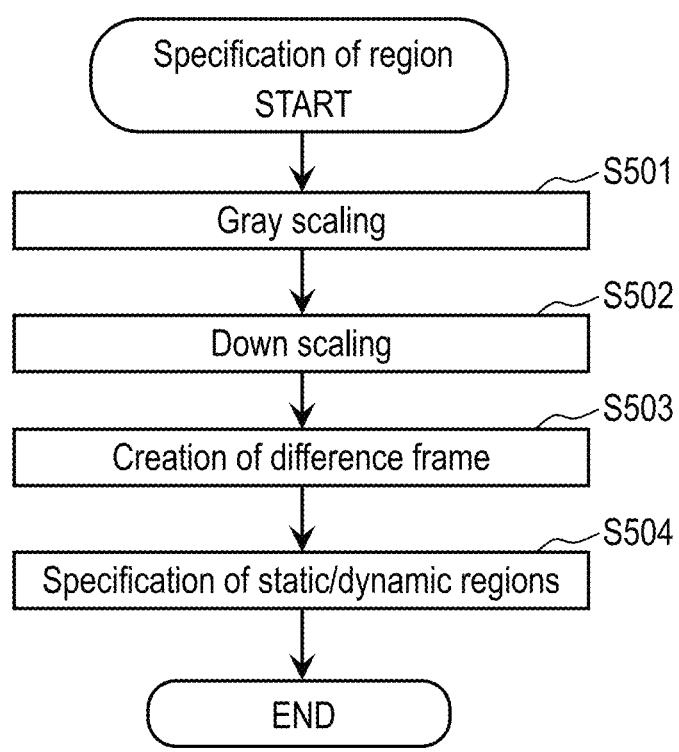
FIG. 8 is a flowchart showing an example of processing for specifying a region in the first exemplary embodiment.

FIG. 8 is a flowchart showing an example of processing for specifying the region in the first exemplary embodiment. The flowchart shown in FIG. 8 illustrates in detail the processing of Step S302 in FIG. 6.

The flowchart shown in FIG. 8 is described below with reference to FIG. 11.

First, region specification section 41 performs gray scaling processing (Step S501).

The gray scaling processing refers to conversion of a color image into a gray scale image, that is, performance of the gray scale conversion. Region specification section 41 executes the gray scaling processing, converts the color information of each pixel of the frame into a brightness value, and thereby converts the color image into the gray scale image. The present disclosure does not limit a method of this conversion. For example, region specification section 41 may extract one of R, G and B of the pixel, and may convert that into the brightness value. Alternatively, the brightness value may be calculated for each pixel. Here, a description is made of an example of performing gray scaling processing for calculating the brightness value for each of the pixels. Note that, as shown in FIG. 3, region specification section 41 that is a main body executing Step S501 is one of the functional blocks that display position controller 40 has. Moreover, referring to FIG. 1, region specification section 41 can also be said to be one of the functional blocks that fingerprint creator 22 has.

An example of frames obtained as a result of the gray scaling processing in Step S501 is shown in (b) of FIG. 11. The frames shown in (b) of FIG. 11 are those obtained by implementing the gray scaling processing for each of the frames shown in (a) of FIG. 11.

Next, region specification section 41 performs down scaling processing (Step S502).

The down scaling processing refers to conversion of the number of pixels, which compose one frame, from an original number of pixels into a smaller number of pixels, that is, performance of the down scale conversion. Region specification section 41 executes the down scaling processing, and converts the image of the frame into an image composed of the smaller number of pixels. The present disclosure does not limit a method of this conversion. For example, region specification section 41 may perform the down scale conversion by dividing the frame into a plurality of blocks so that a plurality of pixels included in the frame can be included in one block, and calculating one brightness value for each of the blocks. At this time, region specification section 41 may calculate, for each of the blocks, an average value, intermediate value or the like of the brightness values of the pixels included in the block, and may define the calculated value as the brightness value of the block.

An example of frames obtained as a result of the down scaling processing in Step S502 is shown in (c) of FIG. 11. The frames shown in (c) of FIG. 11 are those obtained by implementing the down scaling processing for each of the frames shown in (b) of FIG. 11.

Next, region specification section 41 creates the difference frame (Step S503).

The difference frame is created by calculating a difference in the brightness value between two frames temporally adjacent to each other (for example, two temporally continuous frames). Region specification section 41 calculates, for each of the blocks, a difference in the brightness value between the blocks located at the same position, the blocks belonging to the two temporally adjacent frames, and thereby creates the difference frame. Note that the difference (absolute value) in the brightness value calculated for each of the blocks is referred to as a "difference value".

An example of the difference frame created in Step S503 is shown in (d) of FIG. 11. In the difference frame shown in (d) of FIG. 11, the magnitude of the change in the image is displayed by gray scale, and a block in which the change in the image is relatively large is displayed densely, and a block in which the change in the image is relatively small is displayed lightly.

Next, region specification section 41 specifies static/dynamic regions (Step S504).

Such specification of the static/dynamic regions refers to processing for specifying the dynamic region and the static region in the frame. Region specification section 41 specifies a block, in which a difference value in the difference frame created in Step S503 is larger than a predetermined value, as a dynamic block, and specifies a block, in which such a difference value is smaller than the predetermined value, as a static block. Then, region specification section 41 sets the dynamic region so that the dynamic region can include the dynamic block, sets the static region so that the static region can include the static block, and thereby specifies the dynamic region and the static region. Note that, desirably, this predetermined value is set as appropriate based on a maximum value which the difference value can take, and the like so that the dynamic region and the static region can be set as appropriate.

Note that each piece of processing in Step S501 to Step S503 is also processing executed as a part of the processing for creating the fingerprint by fingerprint creator 22. Hence, without performing Step S501 to Step S503, region specification section 41 may acquire the difference frame, which is created by the processing performed in fingerprint creator 22, the processing being the same processing as those of Step S501 to Step S503, from fingerprint creator 22.

Figure 9:
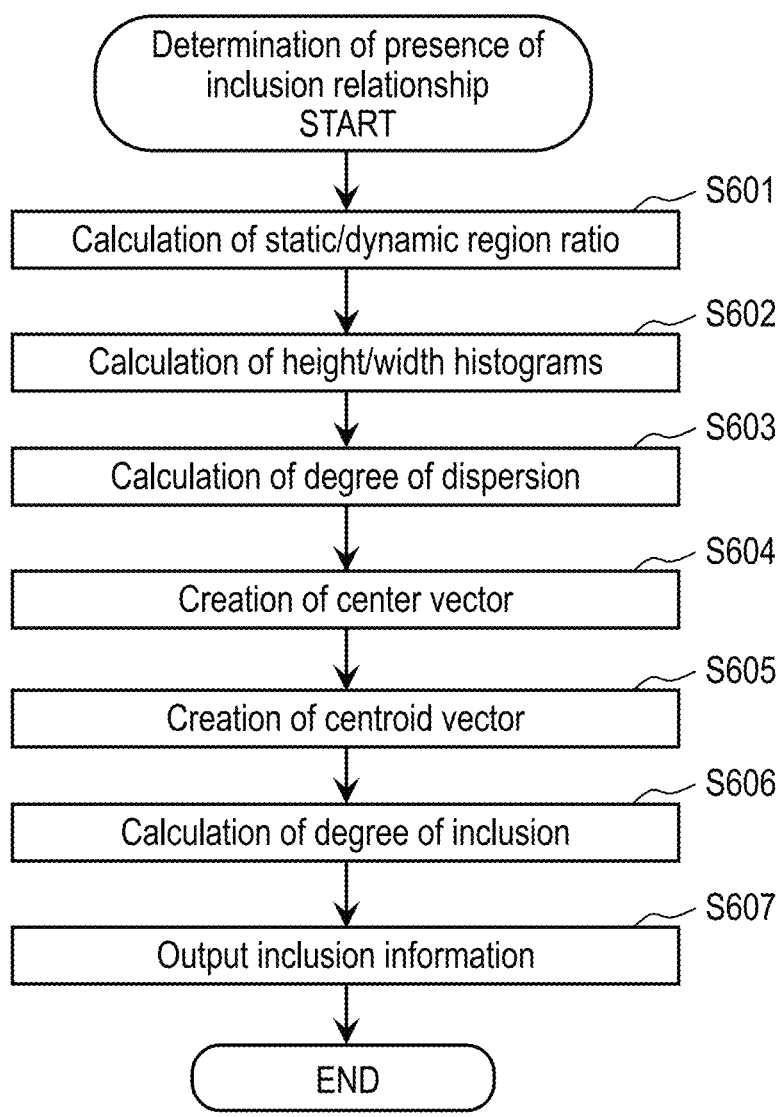
FIG. 9 is a flowchart showing an example of processing for determining a presence of an inclusion relationship in the first exemplary embodiment.

FIG. 9 is a flowchart showing an example of processing for determining the presence of the inclusion relationship in the first exemplary embodiment. The flowchart shown in FIG. 9 illustrates in detail the processing of Step S303 in FIG. 6.

The flowchart shown in FIG. 9 is described below with reference to FIGS. 12 and 13. FIG. 12 is a first view schematically showing a specific example of processing for determining whether to allow the superimposition display in the first exemplary embodiment. FIG. 13 is a second view schematically showing the specific example of the processing for determining the whether to allow the superimposition display in the first exemplary embodiment.

First, inclusion determination section 42 calculates a static/dynamic region ratio (Step S601).

Inclusion determination section 42 calculates a ratio of the static region to the dynamic region specified in Step S504. Note that, as shown in FIG. 3, inclusion determination section 42 that is a main body executing Step S601 is one of the functional blocks of display position controller 40. Moreover, as can be seen from FIG. 1, it also can be said that inclusion determination section 42 is one of the functional blocks that fingerprint creator 22 has.

The processing of Step S601 is specifically described with reference to (a) and (b) of FIG. 12. (a) of FIG. 12 shows an example of the difference frame serving as a target of the processing. (b) of FIG. 12 shows an example of the respective numbers of blocks of the static region and the dynamic region and a ratio thereof in the difference frame shown in (a) of FIG. 12. In the example shown in FIG. 12, the difference frame includes 16 blocks of static region and 2 blocks of dynamic region. Moreover, the ratio of the static region to the dynamic region is 89%: 11%.

Next, inclusion determination section 42 creates a height histogram and width histogram of the region (Step S602).

The height histogram and the width histogram are information indicating a position occupied by the static region or the dynamic region with respect to each direction of the height and the width in the difference frame. Inclusion determination section 42 creates the height histogram and the width histogram for a region (dynamic region in the example shown in FIG. 12) in which the ratio calculated in Step S601 is smaller.

Note that, in this exemplary embodiment, it is assumed that a downward direction is defined as a height direction while taking an uppermost row in the frame as an origin, and that a numeric value increases downward. Moreover, it is assumed that a right direction is defined as a width direction while taking a leftmost column in the frame as an origin, and that a numeric value increases rightward. Note that the above-described height direction and width direction are merely an example, and the present disclosure is never limited to this definition. The height direction and the width direction may be determined by a different definition from the above, and even in such a case, it is possible to perform processing similar to that in the above-definition.

The processing of Step S602 is specifically described with reference to (c) of FIG. 12. (c) of FIG. 12 schematically shows a specific example of a calculation method of the histograms.

First, inclusion determination section 42 takes, as a calculation target of the histograms, the static region or the dynamic region which includes smaller number of blocks in the difference frame serving as the processing target (that is, a region with a smaller area is taken as a calculation target). In the example shown in FIG. 12, the dynamic region serves as the calculation target of the histograms.

Next, with regard to the region as the calculation target, inclusion determination section 42 calculates the height histogram. The height histogram is represented by an array of the same number of numeric values as the number of blocks in the height direction in the difference frame, and each of the numeric values (hereinafter, also referred to as a "frequency") indicates the number of blocks in the width direction of the region as the calculation target. In the example shown in FIG. 12, the number of blocks in each of the height direction and the width direction in the difference frame is 5, and accordingly, the height histogram is represented as information in which 5 numeric values ranging from 0 to 5 are arrayed. In the example shown in FIG. 12, 1 block of dynamic region is present in the width direction in each of a 2nd block and a 3rd block in the height direction of the difference frame but no other block of the dynamic region is present, and accordingly, the height histogram is "0, 1, 1, 0, 0".

Next, with regard to the region as the calculation target, inclusion determination section 42 calculates the width histogram. The width histogram is represented by an array of the same number of numeric values as the number of blocks in the width direction in the difference frame, and each of the numeric values (hereinafter, also referred to as a "frequency") indicates the number of blocks in the height direction of the region as the calculation target. In the example shown in FIG. 12, the number of blocks in each of the width direction and the height direction in the difference frame is 5, and accordingly, the width histogram is represented as information in which 5 numeric values ranging from 0 to 5 are arrayed. In the example shown in FIG. 12, 2 blocks of dynamic region are present in the height direction in a 3rd block in the width direction of the difference frame but no other block of the dynamic region is present, and accordingly, the width histogram is "0, 0, 2, 0, 0".

Next, inclusion determination section 42 calculates a degree of dispersion of the regions (Step S603).

Inclusion determination section 42 calculates the degree of dispersion of the regions in the difference frame by using the height histogram and the width histogram, which are created in Step S602.

The processing of Step S603 is specifically described with reference to (d) of FIG. 12. (d) of FIG. 12 shows a specific example of a calculation method of the degree of dispersion.

The degree of dispersion is calculated as a root mean square of differences between the respective frequencies of the histogram and an average value of the frequencies. In the example shown in FIG. 12, the average value of the frequencies is 0.4 in both of the height histogram and the width histogram. Hence, as shown in (d) of FIG. 12, with regard to the difference frame as the processing target, the degree of dispersion of the dynamic region in the height direction is 0.24, and the degree of dispersion thereof in the width direction is 0.64.

Next, inclusion determination section 42 creates a center weight vector (Step S604).

The center weight vector is an index indicating a distance from a center in the frame to each block therein. Each of the respective elements of the center weight vector corresponds to one block. The respective elements of the center weight vector are numeric values of 0 or more and 1 or less, where the element of the center is 1 whereas the elements get close to 0 with increasing distance from the center. The center weight vector is determined in such a manner as described above. In the example shown in FIG. 12, for example, it is assumed that the center weight vector is set as "0.1, 0.5, 1, 0.5, 0.1".

A block corresponding to an element of a larger numeric value in the center weight vector is likely to be determined to be located at the center in the frame. That is to say, if the numeric values of the respective elements are large in a wide range including the center in the center weight vector, then a wide region including the center in the frame is likely to be recognized as a center portion of the frame. Meanwhile, if the numeric values are large in only elements in a narrow range including the center in the center weight vector, then a narrow region including the center in the frame is likely to be recognized as the center portion of the frame.

Note that, in the example shown in FIG. 12, in the difference frame serving as the processing target, each of the height direction and the width direction has 5 blocks, and accordingly, a center weight vector having 5 elements can be used commonly to the height direction and the width direction. Note that the present disclosure is never limited to this configuration. For example, center weight vectors different from each other between the height direction and the width direction may be used. Note that, in a case where the number of blocks differs between the height direction and the width direction in the difference frame serving as the processing target, it is desirable to use center weight vectors suitable individually for the respective directions.

Next, inclusion determination section 42 creates a centroid vector (Step S605).

The centroid vector is an index indicating a distance from each center of gravity in the height direction and the width direction to each of the blocks. The respective elements of the centroid vector are numeric values of 0 or more and 1 or less, where the element at a position of the center of gravity (or a position closest to the center of gravity) is 1 whereas the elements get close to 0 with increasing distance from the center of gravity. The centroid vector is determined in such a manner as described above.

A block corresponding to an element of a larger numeric value in the centroid weight vector is likely to be determined to be located close to the center of gravity. That is to say, if the numeric values of the respective elements are large in a wide range including the center of gravity in the centroid vector, then a wide region including the center of gravity is likely to be recognized as a center of gravity. Meanwhile, if the numeric values are large in only elements in a narrow range including the center of gravity in the centroid vector, then a narrow region including the center of gravity is likely to be recognized as the center of gravity of the frame.

The centroid vector is calculated individually based on the height histogram with regard to the height direction and on the width histogram with regard to the width direction. (f) of FIG. 13 shows one specific example where the centroid vector in the height direction and the centroid vector in the width direction are respectively obtained from the height histogram and the width histogram illustrated in (c) of FIG. 12, as an example.

First, a description is made of a method for obtaining the centroid vector in the height direction. Products of the respective elements ("0, 1, 1, 0, 0" in the example shown in FIGS. 12 and 13) of the height histogram and coordinates ("1, 2, 3, 4, 5" in the example shown in FIGS. 12 and 13) in the height direction are calculated for all elements of the height histogram, and these products are added together. Then, a result of this addition is divided by the number which is a sum of 1 and the number of blocks (number of blocks of the dynamic region in the example shown in FIG. 13) of the region as a calculation target, and a resulting value is defined as a center of gravity position. In the example shown in FIG. 13, a numeric value 1.6 is obtained, and accordingly, this is rounded off to obtain 2. That is to say, a position of a coordinate "2" in the height direction serves as a position of the center of gravity. Hence, in the centroid vector in the height direction, the element at the position of the coordinate "2" in the height direction is 1, and the respective elements are determined according to distances from the center of gravity so as to get closer to 0 with increase distance from the center of gravity. In such a manner as described above, the centroid vector in the height direction, which is "0.5, 1, 0.5, 0.33, 0.25", is created.

Next, a description is made of a method for obtaining the centroid vector in the width direction. Products of the respective elements ("0, 0, 2, 0, 0" in the example shown in FIGS. 12 and 13) of the width histogram and coordinates ("1, 2, 3, 4, 5" in the example shown in FIGS. 12 and 13) in the width direction are calculated for all elements of the width histogram, and these products are added together. Then, a result of this addition is divided by the number which is a sum of 1 and the number of blocks (number of blocks of the dynamic region in the example shown in FIG. 13) of the region as a calculation target, and a resulting value is defined as a center of gravity position. In the example shown in FIG. 13, a numeric value 2 is obtained, and accordingly, the position of the coordinate "2" in the width direction serves as the position of the center of gravity. Hence, in the centroid vector in the width direction, the element at the position of the coordinate "2" in the width direction is 1, and the respective elements are determined according to distances from the center of gravity so as to get closer to 0 with increasing distance from the center of gravity. In such a manner as described above, the centroid vector in the width direction, which is "0.5, 1, 0.5, 0.33, 0.25", is created.

Note that a reason why 1 is added to a denominator in a calculation formula shown in (f) of FIG. 13 is for avoiding division by 0. Note that the denominator may be set to the number of blocks (25 in the example shown in FIG. 12) of the difference frame serving as the processing target.

Next, inclusion determination section 42 calculates a degree of inclusion (Step S606).

The degree of inclusion is an index indicating a degree at which either one of the static region and the dynamic region includes the other thereof. In a case where the degree of inclusion is larger than a predetermined threshold, inclusion determination section 42 determines that either one of the static region and the dynamic region includes the other. Note that the degree of inclusion is insufficient for determining which of the static region and the dynamic region is a region including the other and which thereof is a region being included.

The degree of inclusion is calculated from the height histogram and the width histogram, which are calculated in Step S602, the center weight vector created in Step S604, and the centroid vector in the height direction and the centroid vector in the width direction, which are created in Step S605.

A specific example of calculation of the degree of inclusion is shown in (g) of FIG. 13.

The degree of inclusion is calculated in such a manner that inclusion vectors are calculated by calculating products of the histograms, the center weight vectors and the centroid weight vectors for each of the blocks individually in the height direction and the width direction, and that averages of elements of the inclusion vectors in the height direction and the width direction are calculated. In the example shown in FIG. 13, the inclusion vector in the height direction is "0, 0.5, 0.5, 0, 0", and the inclusion vector in the width direction is "0, 0, 1, 0, 0". Hence, the degree of inclusion is 0.67.

Next, inclusion determination section 42 outputs inclusion information (Step S607).

The inclusion information is information indicating whether or not the frame serving as the processing target has the inclusion relationship. When the degree of inclusion, which is calculated in Step S606, is larger than the predetermined threshold (hereinafter, also referred to as a "degree-of-inclusion threshold"), inclusion determination section 42 outputs information, which indicates that there is an inclusion relationship, as the inclusion information. For example, if the degree-of-inclusion threshold is set to 0.5, then the degree of inclusion is 0.67 in the example shown in FIG. 13, and accordingly, the inclusion information, which indicates that there is an inclusion relationship, is output from inclusion determination section 42.

Meanwhile, when the degree of inclusion, which is calculated in Step S606, is smaller than the degree-of-inclusion threshold, inclusion determination section 42 outputs information, which indicates that there is no inclusion relationship, as the inclusion information. Note that, in a case where both are equal to each other, it may be determined that there is an inclusion relationship, or it may be determined that there is no inclusion relationship. Note that the respective numeric values listed as the thresholds in this exemplary embodiment are merely examples. Desirably, the respective thresholds are set as appropriate according to specifications of server device 20, and the like.

Figure 10:
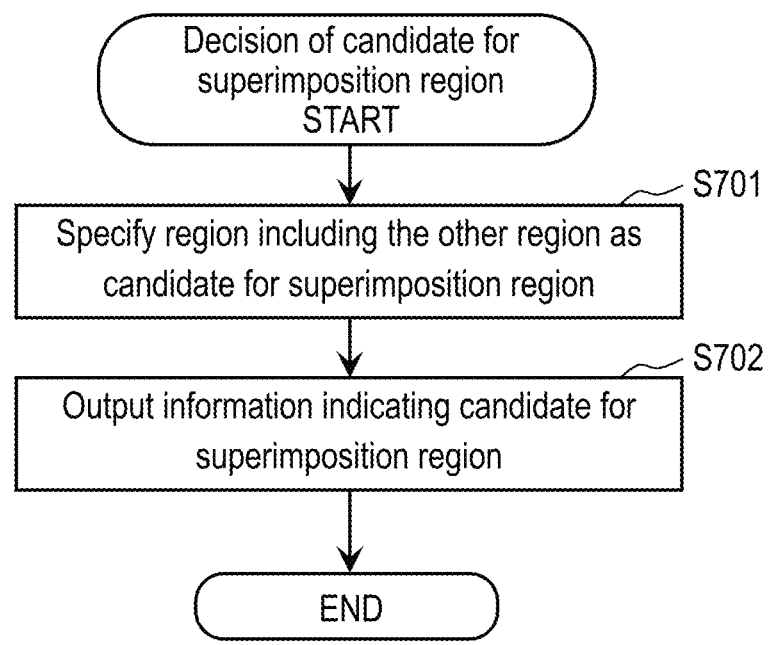
FIG. 10 is a flowchart showing an example of processing for deciding a candidate for a superimposition region in the first exemplary embodiment.

FIG. 10 is a flowchart showing an example of processing for deciding the candidate for the superimposition region in the first exemplary embodiment. The flowchart shown in FIG. 10 illustrates in detail the processing of Step S305 in FIG. 6.

The flowchart shown in FIG. 10 is described below with reference to FIGS. 12 and 13.

First, superimposition region decision section 43 specifies the region including the other region as the candidate for the superimposition region (Step S701).

Superimposition region decision section 43 acquires the inclusion information, which is output in Step S607, and determines whether or not there is an inclusion relationship. In a case where there is an inclusion relationship, superimposition region decision section 43 specifies either region of the static region and the dynamic region, which has a larger number of blocks, as the region including the other region. Note that, as shown in FIG. 3, superimposition region decision section 43 that mainly executes Step S701 is one of the functional blocks of display position controller 40. Moreover, as can be seen from FIG. 1, it also can be said that superimposition region decision section 43 is one of the functional blocks of fingerprint creator 22.

Next, superimposition region decision section 43 outputs information indicating the candidate for the superimposition region (Step S702).

The information indicating the candidate for the superimposition region is information indicating the candidate for the superimposition region, which is specified in Step S701, and includes: information indicating a position of the candidate for the superimposition region in the frame; and information indicating a display time in the video content.

By the series of above-described processing, in each of the plurality of frames, display position controller 40 specifies the region in which the degree of interest of the user is estimated to be relatively low, and decides, as the position at which the additional information is to be displayed, a position included in the specified region for a predetermined time. In such a way, the additional information is superimposed on the region of non-interest in which the degree of interest is estimated to be low on the display screen, and accordingly, the additional information can avoid interfering with the user's viewing of the video content.

Figure 14B:
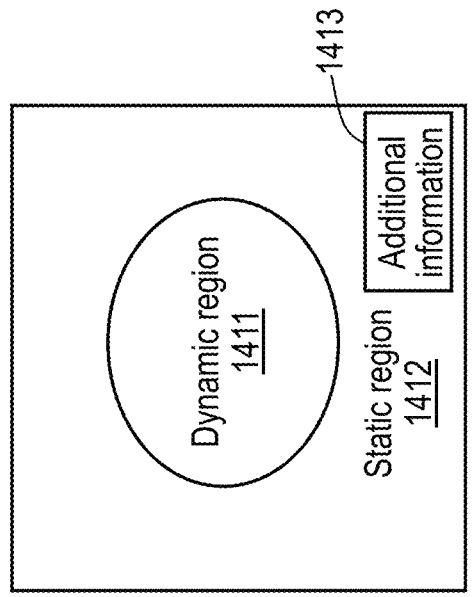
FIG. 14B is a view schematically showing another example of the position of the superimposition region in the first exemplary embodiment.
Figure 14A:
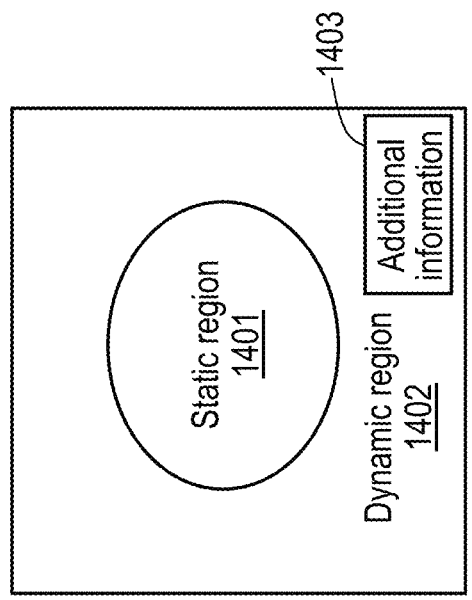
FIG. 14A is a view schematically showing an example of a position of the superimposition region in the first exemplary embodiment.

FIG. 14A is a view schematically showing an example of a position of the superimposition region in the first exemplary embodiment. FIG. 14B is a view schematically showing another example of the position of the superimposition region in the first exemplary embodiment. With reference to FIG. 14A and FIG. 14B, a description is made of the display position of the additional information, which is decided by display position controller 40 in this exemplary embodiment.

In a frame shown as an example in FIG. 14A, static region 1401 is present on a center portion thereof, and dynamic region 1402 is present on a peripheral portion excluding the center portion in the frame. For the frame as described above, by the above-mentioned series of processing, display position controller 40 specifies static region 1401 as the region (region of interest) in which the degree of interest is relatively high, and specifies dynamic region 1402 as the region (region of non-interest) in which the degree of interest is relatively low. Then, display position controller 40 specifies, as the position at which additional information 1403 is to be displayed, a position included in dynamic region 1402. As a result, when the frame is displayed on the display screen, additional information 1403 is displayed at the position included in dynamic region 1402.

In a frame shown as an example in FIG. 14B, dynamic region 1411 is present on a center portion thereof, and static region 1412 is present on a peripheral portion excluding the center portion in the frame. For the frame as described above, by the above-mentioned series of processing, display position controller 40 estimates dynamic region 1411 as the region (region of interest) in which the degree of interest is relatively high, and estimates static region 1412 as the region (region of non-interest) in which the degree of interest is relatively low. Then, display position controller 40 specifies, as the position at which additional information 1413 is to be displayed, a position included in static region 1412. As a result, when the frame is displayed on the display screen, additional information 1413 is displayed at the position included in static region 1412.

[1-7. Effects and the Like]

As described above, in each of the plurality of frames, server device 20 in this exemplary embodiment specifies the region of non-interest, in which the degree of interest of the user is estimated to be relatively low. Then, server device 20 defines, as the position at which the additional information is to be displayed, the position included commonly in the respective regions of non-interest of the plurality of frames.

In such a way, the additional information is superimposed on the position excluding the region of interest, in which the degree of interest is estimated to be high on the display screen, and accordingly, the additional information can avoid interfering with the user's viewing of the video content.

In general, one server device 20 provides the image recognition processing for several hundred to several thousand reception devices 10. In accordance with this exemplary embodiment, the processing for calculating the display position of the additional information is performed in server device 20, whereby, each of reception devices 10 does not need to perform the processing for calculating the display position of the additional information, and a throughput in reception device 10 can be reduced.

Note that these comprehensive or specific aspects may be realized by a system, a device, an integrated circuit, a computer program or a recording medium such as a computer-readable CD-ROM or the like, or may be realized by any combination of the system, the device, the integrated circuit, the computer program and the recording medium.

Second Exemplary Embodiment

In the first exemplary embodiment, the description has been made of the configuration example of performing the image recognition in server device 20. In a second exemplary embodiment, a description is made of a configuration example of performing the image recognition in reception device 10A.

A description is made below of the second exemplary embodiment with reference to FIGS. 15 to 17.

[2-1. Configuration]

Figure 15:
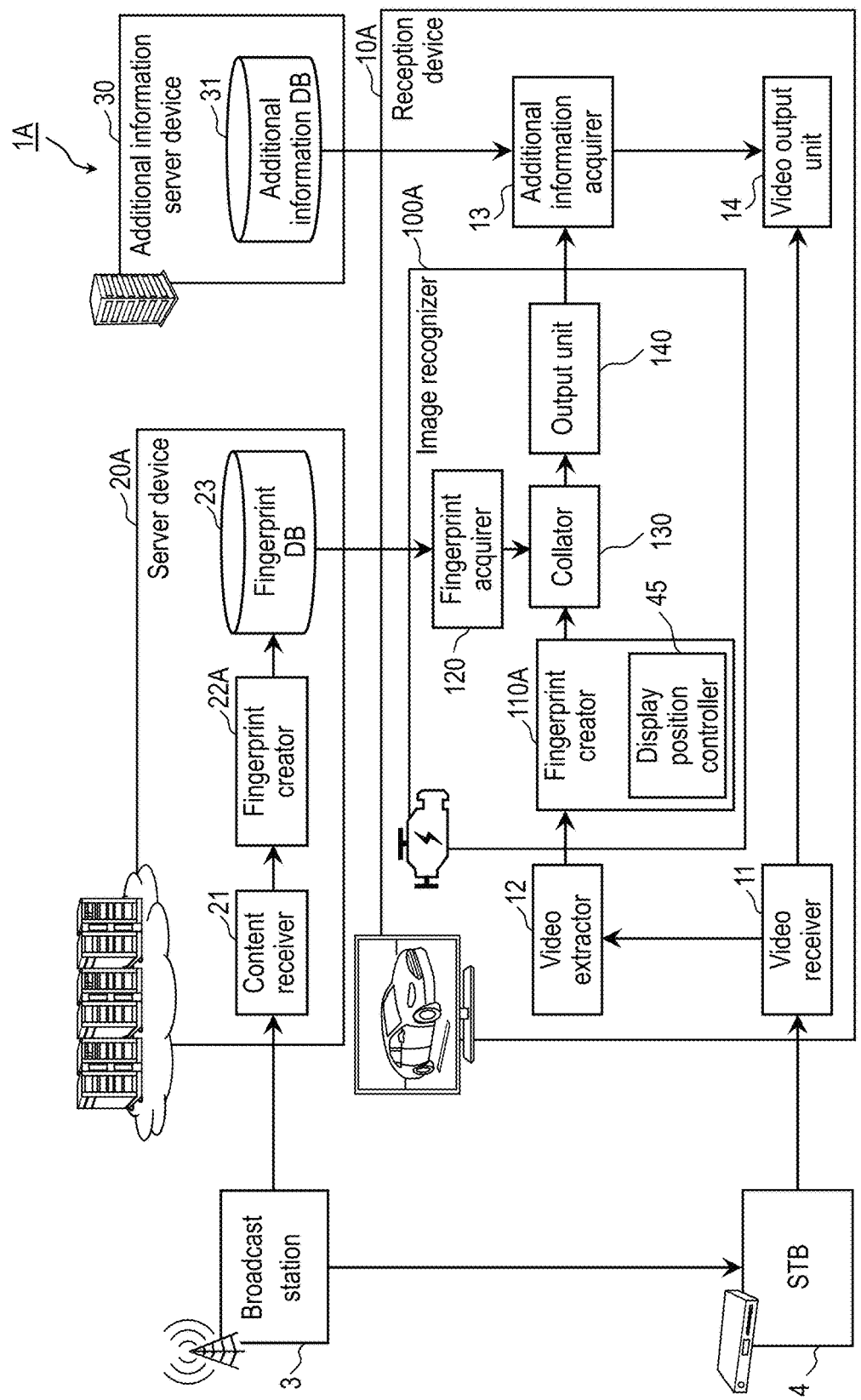
FIG. 15 is a block diagram showing a configuration example of a content recognition system in a second exemplary embodiment.
Figure 16:
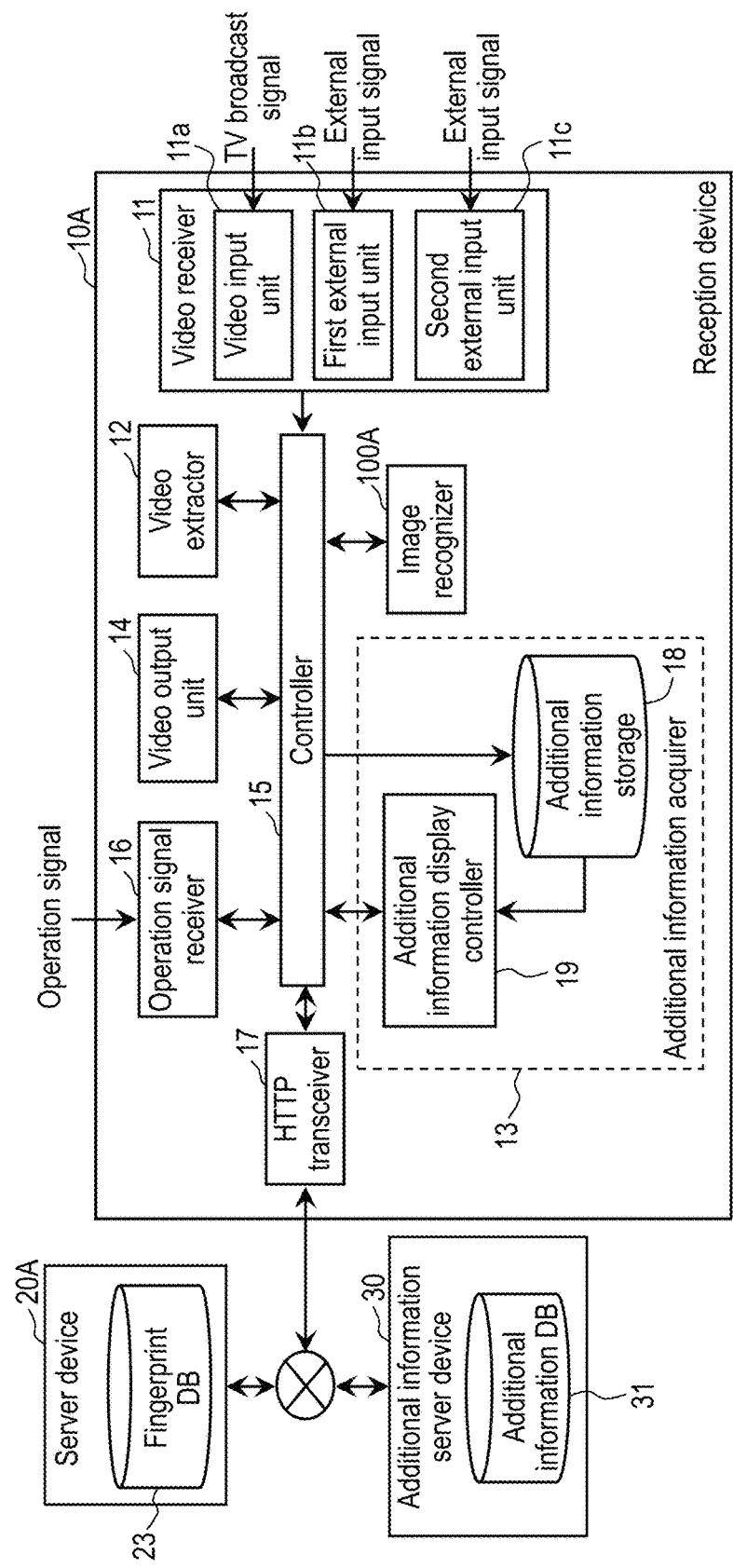
FIG. 16 is a block diagram showing a configuration example of a reception device in the second exemplary embodiment.

First, a description is made of content recognition system 1A in this exemplary embodiment with reference to FIGS. 15 and 16.

FIG. 15 is a block diagram showing a configuration example of content recognition system 1A in the second exemplary embodiment.

FIG. 16 is a block diagram showing a configuration example of reception device 10A in the second exemplary embodiment. Note that FIG. 16 shows a main hardware configuration of reception device 10A.

As shown in FIG. 15, content recognition system 1A includes: broadcast station 3; STB (Set Top Box) 4; reception device 10A; server device 20A; and additional information server device 30. In the second exemplary embodiment, reception device 10A is an example of the display control device.

Hereinbelow, the same reference numerals as those assigned in the first exemplary embodiment are assigned to constituent elements which perform substantially the same operations as those of the constituent elements described in the first exemplary embodiment, and a duplicate description is omitted. In this exemplary embodiment, a description is made of differences from those of the first exemplary embodiment.

Reception device 10A includes: image recognizer 100A; video receiver 11; video extractor 12; additional information acquirer 13; video output unit 14; controller 15; operation signal receiver 16; and HTTP transceiver 17.

Image recognizer 100A includes: fingerprint creator 110A; fingerprint acquirer 120; collator 130; and output unit 140.

Fingerprint creator 110A performs substantially the same operation as that of fingerprint creator 110 described in the first exemplary embodiment. Based on the video content received by video receiver 11, fingerprint creator 110A creates the fingerprints. Moreover, fingerprint creator 110A includes display position controller 45.

Display position controller 45 performs substantially the same operation as that of display position controller 40 provided in server device 20 described in the first exemplary embodiment. Display position controller 45 is a control circuit that controls a display position of the additional information when video output unit 14 displays the received video content on the display screen.

Fingerprint acquirer 120 acquires the fingerprints from fingerprint DB 23 of server device 20A. The fingerprints acquired by fingerprint acquirer 120 are fingerprints of a predetermined number of pieces of video content, which include video content broadcasted from broadcast station 3 at a point of time when the image recognition processing is performed in image recognizer 100A, among the fingerprints accumulated in fingerprint DB 23.

Collator 130 performs substantially the same operation as that of collator 25 provided in server device 20 described in the first exemplary embodiment. Collator 130 collates the fingerprints, which are created by fingerprint creator 110A, with the fingerprints acquired from server device 20A by fingerprint acquirer 120.

Server device 20A includes: content receiver 21; fingerprint creator 22A; and fingerprint DB 23.

Based on the received video content, fingerprint creator 22A creates the fingerprints for each piece of the video content. Fingerprint creator 22A does not include the display position controller. In this point, fingerprint creator 22A is different from fingerprint creator 22 in the first exemplary embodiment.

[2-2. Operations]

Figure 17:
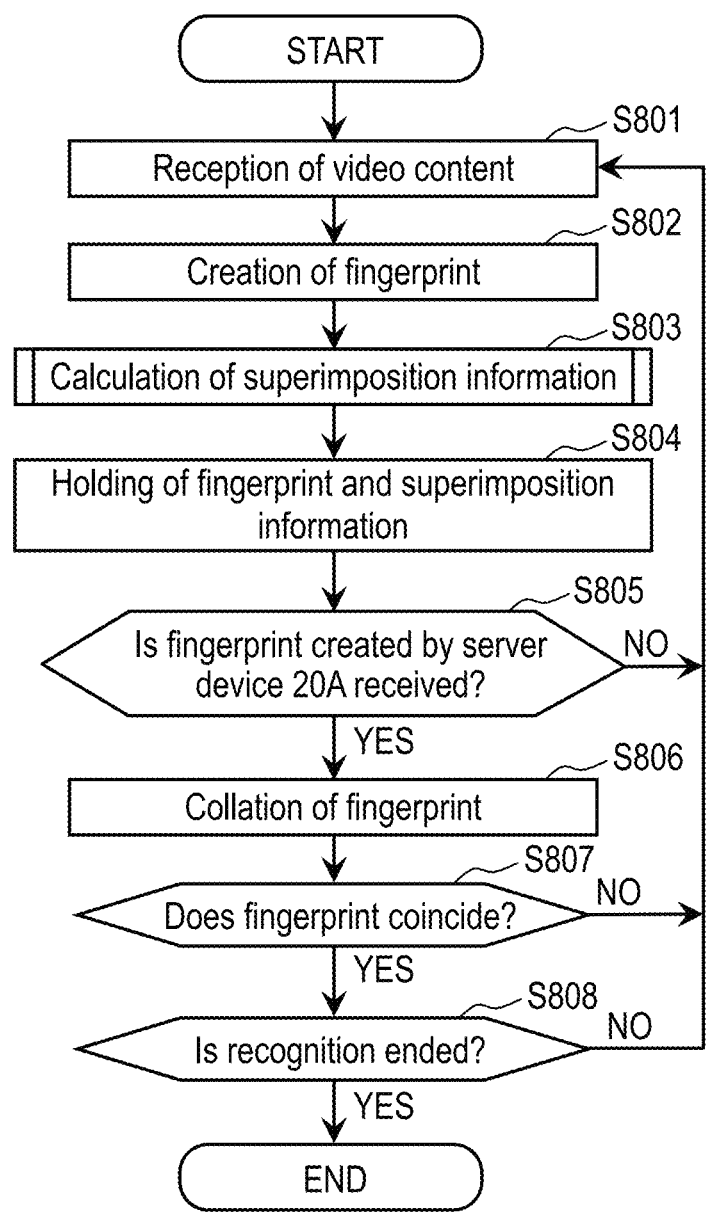
FIG. 17 is a flowchart showing an example of content recognition processing in the second exemplary embodiment.

FIG. 17 is a flowchart showing an example of the content recognition processing in the second exemplary embodiment.

First, video receiver 11 receives the video content, which is transmitted from broadcast station 3 and includes the plurality of frames (Step S801).

Next, fingerprint creator 110A creates the fingerprint with regard to the plurality of frames of the video content received by video receiver 11 in Step S801 (Step S802).

Next, display position controller 45 calculates superimposition information (Step S803).

Next, in a case where the video content received by video receiver 11 in Step S801 is displayed on the display screen together with the additional information, display position controller 45 calculates such a display position of the additional information on the video content, and a display period of the additional information. This additional information is additional information associated by additional information DB 31 with the fingerprint created in Step S802 with regard to the video content received in Step S801. Note that a region on which the additional information is displayed on the video content is a "superimposition region", and a period during which the additional information is displayed on the video content is a "superimposition period".

Next, fingerprint creator 110A stores the fingerprint, which is created in Step S802, and the superimposition region information, which is created in Step S803, in a storage device (not shown) provided in reception device 10A (Step S804).

Next, fingerprint acquirer 120 waits for reception of the fingerprint, which is created in server device 20A, from server device 20A (Step S805). Here, the fingerprint of which reception is awaited by fingerprint acquirer 120 is a fingerprint created by fingerprint creator 22A of server device 20A from the same video content as the video content received by video receiver 11.

When fingerprint acquirer 120 receives the fingerprint in Step S805 (Yes in Step S805), the processing proceeds to Step S806. Meanwhile, when fingerprint acquirer 120 does not receive the fingerprint in Step S805 (No in Step S805), the processing returns to Step S801, and video receiver 11 newly receives video content.

Collator 130 collates the fingerprint, which is created by fingerprint creator 110A in Step S802, with the fingerprint, which is received from server device 20A in Step S805 (Step S806).

Next, collator 130 determines whether or not the two collated fingerprints coincide with each other as a result of the collation in Step S806 (Step S807).

Collator 130 determines whether or not the fingerprint, which is created by fingerprint creator 110A in Step S802, and the fingerprint, which is received from server device 20A in Step S805, coincide with each other.

When collator 130 determines that the two fingerprints coincide with each other in Step S807 (Yes in Step S807), the processing proceeds to Step S808. Meanwhile, when collator 130 determines that the two fingerprints do not coincide with each other (No in Step S807), the processing returns to Step S801, and video receiver 11 newly receives video content.

Next, image recognizer 100A determines whether or not the recognition of the video content is completed (Step S808).

Image recognizer 100A determines whether or not the information, which indicates the result of the image recognition, and the superimposition region information are obtained for each of the plurality of frames included in the video content. Then, in a case where it is determined that the information, which indicates the result of the image recognition, and the superimposition region information are obtained for all of the frames, the content recognition processing is ended (Yes in Step S808). Meanwhile, in a case where it is determined that there is a frame for which the information, which indicates the result of the image recognition, and the superimposition region information are not obtained yet (No in Step S808), the processing returns to Step S801, and video receiver 11 newly receives video content.

[2-3. Effects and the Like]

As described above, in each of the plurality of frames, reception device 10A in this exemplary embodiment specifies the region of non-interest, in which the degree of interest of the user is estimated to be relatively low. Then, reception device 10A defines, as the position at which the additional information is to be displayed, the position included commonly in the respective regions of non-interest of the plurality of frames.

In such a way, the additional information is superimposed on the position excluding the region of interest, in which the degree of interest is estimated to be high on the display screen, and accordingly, the additional information can avoid interfering with the user's viewing of the video content.

In accordance with this exemplary embodiment, reception device 10A performs the processing for calculating the display position of the additional information. Therefore, processing appropriate to the configuration and installation environment of reception device 10A can be performed.

[3. Conclusion]

As described above, the display control device in the present disclosure is a device for displaying the video content on the display screen together with the additional information associated with the video content by using the fingerprint. This display control device includes: a region specification section; a region-of-interest estimation section; and a position decision section. In each of the plurality of frames included in the video content, the region specification section specifies the first region and the second region included in the region excluding the first region in the frame.

In each of the plurality of frames, the region-of-interest estimation section specifies either one of the first region and the second region as a region of interest and the other thereof as a region of non-interest based on a positional relationship between the first region and the second region. The position decision section defines, as a position at which the additional information is to be displayed, a position included commonly in the respective regions of non-interest of the plurality of frames.

Note that each of server device 20 and reception device 10A is an example of the display control device. Each of region specification section 41, region specification section 52 and display position controller 45 is an example of the region specification section. Each of inclusion determination section 42, region-of-interest estimation section 53 and display position controller 45 is an example of the region-of-interest estimation section. Each of superimposition region decision section 43, position decision section 54 and display position controller 45 is an example of the position decision section. The dynamic region is an example of the first region, and the static region is an example of the second region. Between the first region and the second region, which are in the inclusion relationship, the included region is an example of the region of interest, and the including region is an example of the region of non-interest. Each of static region 1401 and dynamic region 1411 is an example of the region of interest, and each of dynamic region 1402 and static region 1412 is an example of the region of non-interest.

In accordance with the display control device shown in the present disclosure, in each of the plurality of frames, the additional information can be displayed on the region in which the degree of interest of the user is estimated to be relatively low. In such a way, the additional information is superimposed on the position excluding the region of interest, in which the degree of interest is estimated to be high on the display screen, and accordingly, the additional information can avoid interfering with the user's viewing of the video content.

Moreover, in accordance with the display control device shown in the present disclosure, the position included commonly in the respective regions of non-interest of the plurality of frames is defined as the position at which the additional information is to be displayed. Hence, such a situation that the additional information moves in the display screen frequently is prevented, and the additional information can avoid interfering with the user's viewing of the video content.

Moreover, in the display control device, in the case where the first region and the second region are in the positional relationship in which either one of the first region and the second region includes the other region in each of the plurality of frames, the region-of-interest estimation section may specify the including region as the region of non-interest, and may specify the included region as the region of interest.

In this case, for example, if the first region surrounds at least a part of the periphery of the second region in each of the plurality of frames, then the display control device estimates that the user is interested in the second region. That is to say, the display control device estimates that the first region is a region in which the degree of interest of the user is relatively low, and decides the position at which the additional information is to be displayed in the first region. In such a way, the display control device can accurately estimate the region of interest and the region of non-interest, and can display the additional information at a more appropriate position on the video content.

Moreover, in the display control device, the position decision section may create information indicating the position at which the additional information is to be displayed, when the period while the plurality of frames in which the additional information is superimposed is displayed on the display screen is a predetermined time or more.

In this case, the display control device can determine not to display the additional information in a case where the period while the plurality of frames which serve as superimposition targets of the additional information are displayed on the display screen is short. In such a way, additional information, which is difficult to visually recognize for the user since a display period thereof is short, can be prevented from being displayed on the display screen.

Moreover, in the display control device, the position decision section may create the information indicating the position at which the additional information is to be displayed, when the region of the position at which the additional information is to be displayed has a predetermined area or more.

In this case, the display control device can determine to display the additional information on the display screen only in a case where such a region onto which the additional information is superimposed is ensured. Hence, the additional information can be prevented from being displayed on the region of interest in an overlapping manner.

Moreover, in the display control device, the region specification section may detect the change in the image between the two temporally adjacent frames, may specify the region in which the change in the image is larger than the predetermined value as the dynamic region, may specify the region in which the change in the image is smaller than the predetermined value as the static region, may specify one of the static region and the dynamic region as the first region, and may specify the other region as the second region.

Moreover, the display control method in the present disclosure is a display control method for displaying the video content on the display screen together with the additional information associated with the video content by using the fingerprint. In this display control method, in each of the plurality of frames included in the video content, the first region and the second region included in the region excluding the first region in the frame are specified, and in each of the plurality of frames, based on the positional relationship between the first region and the second region, either one of the first region and the second region is defined as the region of interest, and the other is defined as the region of non-interest, and the position included commonly in the respective regions of non-interest of the plurality of frames may be defined as the position at which the additional information is to be displayed.

In such a way, similar effects to those of the above-described display control device can be obtained.

Other Exemplary Embodiments

As above, the first and second exemplary embodiments have been described as exemplification of the technology disclosed in this application. However, the technology in the present disclosure is not limited to this, and is applicable also to exemplary embodiments, which are appropriately subjected to alteration, replacement, addition, omission, and the like. Moreover, it is also possible to constitute new exemplary embodiments by combining the respective constituent elements, which are described in the foregoing first and second exemplary embodiments, with one another.

In this connection, another exemplary embodiment is exemplified below.

Figure 18:
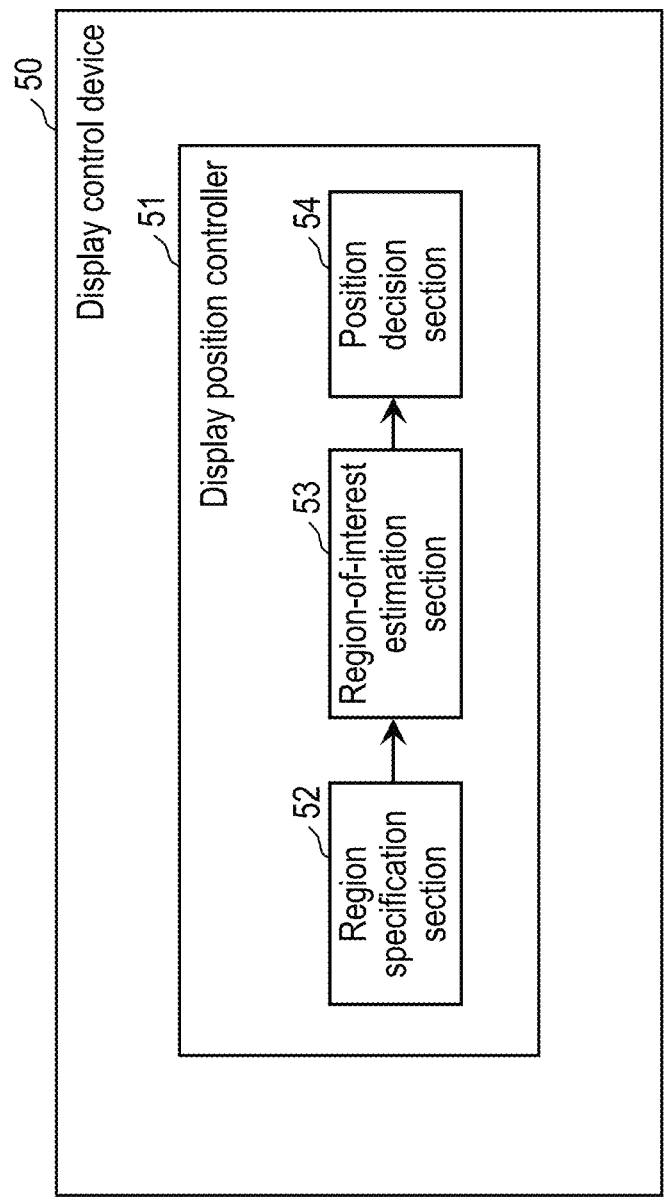
FIG. 18 is a block diagram showing a modification example of the configuration of the display control device in the exemplary embodiments.

FIG. 18 is a block diagram showing a modification example of the configuration of display control device 50 in the exemplary embodiments.

As shown in FIG. 18, display control device 50 includes display position controller 51.

Display position controller 51 includes: region specification section 52; region-of-interest estimation section 53; and position decision section 54. In each of the plurality of frames included in the video content, region specification section 52 specifies the first region and the second region included in the region excluding the first region in the frame. In each of the plurality of frames, region-of-interest estimation section 53 decides either one of the first region and the second region as the region of interest and decides the other thereof as the region of non-interest based on the positional relationship between the first region and the second region. Position decision section 54 decides, as the position at which the additional information is to be displayed, the position included commonly in the respective regions of non-interest in the plurality of frames.

In such a way, display control device 50 can superimpose the additional information at more appropriate position on the video contents, and can display the video content on which the additional information is superimposed on the display screen.

In the first exemplary embodiment, the operation example is shown, in which server device 20 performs the recognition of the video content substantially in real time; however, the present disclosure is never limited to this operation example. For example, also in the case where reception device 10 reads out and displays the video content stored in the recording medium (for example, recorded program content), server device 20 can operate as in the case of the above-mentioned first exemplary embodiment, and can recognize the video content.

For example, server device 20 shown in the first exemplary embodiment can be used for recognition of advertisement content. Alternatively, server device 20 can also be used for recognition of program content such as a drama, a variety show, and the like. At this time, reception device 10 may acquire information regarding, for example, a profile of a cast himself/herself, clothes worn by the cast, a place where the cast visits, and the like as the additional information, which is based on the result of the image recognition, from additional information server device 30, and may display those pieces of acquired information on the video being displayed while superimposing the same information thereon.

Server device 20 may receive not only the advertisement content but also the video content such as the program content or the like, and may create fingerprints corresponding to the video content. Then, fingerprint DB 23 may hold not only the advertisement content but also the fingerprints, which correspond to the program content, in association with the content ID.

Note that the present disclosure not only can be realized as a device, but also may be realized by a method using, as steps, processing means which composes the device. Moreover, the present disclosure may be realized as a program for causing a computer to execute these steps. Moreover, the present disclosure may be realized as a computer-readable recording medium such as a CD-ROM or the like, in which the program is recorded. Furthermore, these can be realized as an integrated circuit, or can be realized as information, data or a signal, which indicates the program. Then, these program, information, data and signal may be distributed via a communication network such as the Internet or the like.

Moreover, in the exemplary embodiments, the respective pieces of processing (respective functions) may be realized by being processed in a centralized manner by a single device (system), or alternatively, may be realized by being processed in a distributed manner by a plurality of devices.

As above, the exemplary embodiments have been described as the exemplification of the technology in the present disclosure. For this purpose, the accompanying drawings and the detailed description are provided.

Hence, the constituent elements described in the accompanying drawings and the detailed description can include not only constituent elements, which are essential for solving the problem, but also constituent elements, which are provided for exemplifying the above-described technology, and are not essential for solving the problem. Therefore, it should not be immediately recognized that such non-essential constituent elements are essential based on the fact that the non-essential constituent elements are described in the accompanying drawings and the detailed description.

Moreover, the above-mentioned exemplary embodiments are those for exemplifying the technology in the present disclosure, and accordingly, can be subjected to varieties of alterations, replacements, additions, omissions and the like within the scope of claims or within the scope of equivalents thereof.

INDUSTRIAL APPLICABILITY

The present disclosure is applicable to a display control device that displays the additional information at a more appropriate position on the video content. Specifically, the present disclosure is applicable to a video reception device such as a television set or the like, a server device or the like.

REFERENCE MARKS IN THE DRAWINGS 1, 1A: content recognition system
3: broadcast station
4: STB
10, 10A: reception device
11: video receiver
11a: video input unit
11b: first external input unit
11c: second external input unit
12: video extractor
13: additional information acquirer
14: video output unit
15: controller
16: operation signal receiver
17: HTTP transceiver
18: additional information storage
19: additional information display controller
20, 20A: server device
21: content receiver
22, 22A, 110, 110A: fingerprint creator
23: fingerprint DB
24: display position information
25, 130: collator
30: additional information server device
31: additional information DB
40, 45, 51: display position controller
41, 52: region specification section
42: inclusion determination section 43: superimposition region decision section
50: display control device
53: region-of-interest estimation section
54: position decision section
100, 100A: image recognizer
120: fingerprint acquirer
140: output unit
1401, 1412: static region
1402, 1411: dynamic region
1403, 1413: additional information

The invention claimed is:

1. A display control device for displaying video content on a display screen together with additional information associated with the video content by using a fingerprint, the display control device comprising:
 a region specification section that specifies, in each of a plurality of frames included in the video content, a first region and a second region included in a region excluding the first region in each of the frames;
 a region-of-interest estimation section that specifies, in each of the plurality of frames, either one of the first region and the second region as a region of interest and the other region as a region of non-interest based on a positional relationship between the first region and the second region; and
 a position decision section that defines, as a position at which the additional information is to be displayed, a position included commonly in the respective regions of non-interest of the plurality of frames.

2. The display control device according to claim 1, wherein, in a case where the first region and the second region are in a positional relationship in which either one of the first region and the second region surrounds an entire or a part of a periphery of the other region, the region-of-interest estimation section specifies, in each of the plurality of frames, an including region as the region of non-interest, and specifies an included region as the region of interest.

3. The display control device according to claim 1, wherein the position decision section creates information indicating the position at which the additional information is to be displayed, when a period during which the plurality of frames in which the additional information is superimposed are displayed on the display screen is equal to or longer than a predetermined time.

4. The display control device according to claim 1, wherein the position decision section creates information indicating the position at which the additional information is to be displayed, when a region of the position at which the additional information is to be displayed has a predetermined area or more.

5. The display control device according to claim 1, wherein the region specification section detects a change in an image between two temporally adjacent frames, specifies a region in which the change in an image is larger than a predetermined value as a dynamic region, specifies a region in which the change in an image is smaller than the predetermined value as a static region, specifies one of the static region and the dynamic region as the first region, and specifies the other region as the second region.

6. A display control method for displaying video content on a display screen together with additional information associated with the video content by using a fingerprint, the display control method comprising:
 specifying, in each of a plurality of frames included in the video content, a first region and a second region included in a region excluding the first region in each of the frames;
 specifying, in each of the plurality of frames, either one of the first region and the second region as a region of interest and the other region as a region of non-interest based on a positional relationship between the first region and the second region; and
 defining, as a position at which the additional information is to be displayed, a position included commonly in the respective regions of non-interest of the plurality of frames.

7. A non-transitory computer-readable recording medium storing a computer program for causing a computer to execute the display control method according to claim 6.

* * * * *